US011250312B2

(12) United States Patent
Bell et al.

(10) Patent No.: US 11,250,312 B2
(45) Date of Patent: Feb. 15, 2022

(54) GARMENTS WITH FINISHING PATTERNS CREATED BY LASER AND NEURAL NETWORK

(71) Applicant: Levi Strauss & Co., San Francisco, CA (US)

(72) Inventors: Benjamin Bell, San Francisco, CA (US); Debdulal Mahanty, Fremont, CA (US); Christopher Schultz, San Francisco, CA (US); Jennifer Schultz, San Francisco, CA (US)

(73) Assignee: Levi Strauss & Co., San Francisco, CA (US)

( * ) Notice: Subject to any disclaimer, the term of this patent is extended or adjusted under 35 U.S.C. 154(b) by 169 days.

(21) Appl. No.: 16/177,422

(22) Filed: Oct. 31, 2018

(65) Prior Publication Data

US 2019/0125016 A1 May 2, 2019

Related U.S. Application Data

(60) Provisional application No. 62/579,867, filed on Oct. 31, 2017.

(51) Int. Cl.
*A41D 27/00* (2006.01)
*A41D 1/06* (2006.01)
(Continued)

(52) U.S. Cl.
CPC .............. *G06N 3/0454* (2013.01); *A41B 1/08* (2013.01); *A41D 1/02* (2013.01); *A41D 1/04* (2013.01);
(Continued)

(58) Field of Classification Search
CPC .......... A41D 27/00; A41D 1/06; A41D 1/089; A41D 1/02; A41D 1/04; A41D 1/14;
(Continued)

(56) References Cited

U.S. PATENT DOCUMENTS 3,883,298 A 5/1975 Platt
3,983,132 A 9/1976 Strobel
(Continued)

FOREIGN PATENT DOCUMENTS

CA 2066978 A1 6/1993
CN 101187640 A 5/2008
(Continued)

OTHER PUBLICATIONS

MakeYourOwnJeans, "Comparing the Different Fade Types for Denim," available at https://www.makeyourownjeans.com/blog/comparing-the-different-fade-types-for-denim/, published on Nov. 10, 2015 (Year: 2015).*
(Continued)

*Primary Examiner* — Jeremy R Pierce
(74) *Attorney, Agent, or Firm* — Aka Chan LLP

(57) ABSTRACT

Software and lasers are used in finishing apparel to produce a desired wear pattern or other design. A technique includes using machine learning to create or extract a laser input file for wear pattern from an existing garment. Machine learning can be by a generative adversarial network, having generative and discriminative neural nets. The generative adversarial network is trained and then used to create a model. This model is used generate the laser input file from an image of the existing garment with the finishing pattern. With this laser input file, a laser can re-create the wear pattern from the existing garment onto a new garment.

21 Claims, 22 Drawing Sheets

(51) Int. Cl.

| | |
|---|---|
| *A41D 1/08* | (2018.01) |
| *A41D 1/14* | (2006.01) |
| *A41D 3/00* | (2006.01) |
| *D03D 1/00* | (2006.01) |
| *D03D 15/00* | (2021.01) |
| *G06N 3/02* | (2006.01) |
| *G06N 3/04* | (2006.01) |
| *D06B 11/00* | (2006.01) |
| *D06M 10/00* | (2006.01) |
| *G06K 9/62* | (2022.01) |
| *D06C 23/02* | (2006.01) |
| *A41D 27/08* | (2006.01) |
| *D06P 5/15* | (2006.01) |
| *D06P 5/20* | (2006.01) |
| *D03D 15/43* | (2021.01) |
| *A41D 1/089* | (2018.01) |
| *A41B 1/08* | (2006.01) |
| *A41D 1/02* | (2006.01) |
| *A41D 1/04* | (2006.01) |
| *A41H 43/00* | (2006.01) |
| *G06N 3/08* | (2006.01) |
| *D06P 1/22* | (2006.01) |

(52) U.S. Cl.
CPC .............. *A41D 1/089* (2018.01); *A41D 1/14* (2013.01); *A41D 3/00* (2013.01); *A41D 27/00* (2013.01); *A41D 27/08* (2013.01); *A41H 43/00* (2013.01); *D03D 1/00* (2013.01); *D03D 15/43* (2021.01); *D06B 11/0096* (2013.01); *D06C 23/02* (2013.01); *D06M 10/005* (2013.01); *D06P 5/15* (2013.01); *D06P 5/2011* (2013.01); *G06K 9/6256* (2013.01); *G06N 3/02* (2013.01); *G06N 3/088* (2013.01); *A41B 2500/20* (2013.01); *A41D 1/06* (2013.01); *A41D 2500/20* (2013.01); *D06P 1/228* (2013.01); *D10B 2501/04* (2013.01)

(58) Field of Classification Search
CPC ........ A41D 3/00; D03D 1/00; D03D 15/0094; A41B 1/08; G06N 3/02
See application file for complete search history.

(56) References Cited

U.S. PATENT DOCUMENTS

| | | | |
|---|---|---|---|
| 4,527,383 A | 7/1985 | Bingham | |
| 5,015,849 A | 5/1991 | Gilpatrick | |
| 5,185,511 A | 2/1993 | Yabu | |
| 5,201,027 A | 4/1993 | Casini | |
| 5,367,141 A | 11/1994 | Piltch | |
| 5,537,939 A | 7/1996 | Horton | |
| 5,567,207 A | 10/1996 | Lockman et al. | |
| 5,573,851 A | 11/1996 | Lengers et al. | |
| 5,605,641 A | 2/1997 | Chiba et al. | |
| 5,839,380 A | 11/1998 | Muto | |
| 5,880,430 A | 3/1999 | Wein | |
| 5,916,461 A | 6/1999 | Costin et al. | |
| 5,990,444 A | 11/1999 | Costin | |
| 6,002,099 A | 12/1999 | Martin et al. | |
| 6,004,018 A | 12/1999 | Kawasato et al. | |
| 6,086,966 A | 7/2000 | Gundjian et al. | |
| 6,090,158 A * | 7/2000 | McLaughlin | D06C 23/02 223/1 |
| 6,140,602 A | 10/2000 | Costin | |
| 6,192,292 B1 | 2/2001 | Taguchi | |
| 6,252,196 B1 | 6/2001 | Costin et al. | |
| 6,315,202 B2 | 11/2001 | Costin et al. | |
| 6,356,648 B1 | 3/2002 | Taguchi | |
| 6,407,361 B1 | 6/2002 | Williams | |
| 6,465,046 B1 | 10/2002 | Hansson et al. | |
| 6,495,237 B1 | 12/2002 | Costin | |
| 6,548,428 B1 | 4/2003 | Lanitz et al. | |
| 6,576,862 B1 | 6/2003 | Costin et al. | |
| 6,616,710 B1 | 9/2003 | Costin et al. | |
| 6,664,505 B2 | 12/2003 | Martin | |
| 6,685,868 B2 | 2/2004 | Costin | |
| 6,689,517 B1 | 2/2004 | Kaminsky et al. | |
| 6,706,785 B1 | 3/2004 | Fu | |
| 6,726,317 B2 | 4/2004 | Codos | |
| 6,753,501 B1 | 6/2004 | Costin, Sr. et al. | |
| 6,765,608 B1 | 7/2004 | Himeda et al. | |
| 6,807,456 B1 | 10/2004 | Costin, Jr. et al. | |
| 6,819,972 B1 | 11/2004 | Martin et al. | |
| 6,832,125 B2 | 12/2004 | Sonnenberg et al. | |
| 6,836,694 B1 | 12/2004 | Podubrin | |
| 6,836,695 B1 | 12/2004 | Goldman | |
| 6,858,815 B1 | 2/2005 | Costin | |
| 6,956,596 B2 | 10/2005 | Kataoka et al. | |
| 6,962,609 B2 | 11/2005 | Rogers et al. | |
| 6,974,366 B1 | 12/2005 | Johnson | |
| 7,005,603 B2 | 2/2006 | Addington et al. | |
| 7,054,043 B2 | 5/2006 | Mengel et al. | |
| 7,057,756 B2 | 6/2006 | Ogasahara et al. | |
| 7,072,733 B2 | 7/2006 | Magee et al. | |
| 7,100,341 B2 | 9/2006 | McIlvaine | |
| 7,240,408 B2 | 7/2007 | Latos et al. | |
| 7,260,445 B2 | 8/2007 | Weiser et al. | |
| 7,324,867 B2 | 1/2008 | Dinauer et al. | |
| 7,699,896 B1 | 4/2010 | Colwell | |
| 7,708,483 B2 | 5/2010 | Samii et al. | |
| 7,728,931 B2 | 6/2010 | Hoffmuller | |
| 7,863,584 B2 | 1/2011 | Tardif et al. | |
| 7,937,173 B2 | 5/2011 | Weill et al. | |
| 8,048,608 B2 | 11/2011 | Jarvis et al. | |
| 8,278,244 B2 | 10/2012 | Stubbs et al. | |
| 8,360,323 B2 | 1/2013 | Widzinski, Jr. et al. | |
| 8,405,885 B2 | 3/2013 | Shah et al. | |
| 8,460,566 B2 | 6/2013 | Costin, Jr. | |
| 8,529,775 B2 | 9/2013 | Costin et al. | |
| 8,556,319 B2 | 10/2013 | Petouhoff et al. | |
| 8,581,142 B2 | 11/2013 | Colico et al. | |
| 8,585,956 B1 | 11/2013 | Pagryzinski et al. | |
| 8,734,679 B2 | 5/2014 | Marguerettaz et al. | |
| 8,794,724 B2 | 8/2014 | Costin, Sr. et al. | |
| 8,849,444 B2 | 9/2014 | George | |
| 8,883,293 B2 | 11/2014 | Weedlun et al. | |
| 8,921,732 B2 | 12/2014 | Costin et al. | |
| 8,974,016 B2 | 3/2015 | Costin, Sr. et al. | |
| 9,034,089 B2 | 5/2015 | Jarvis et al. | |
| 9,050,686 B2 | 6/2015 | Costin, Sr. et al. | |
| 9,126,423 B2 | 9/2015 | Costin, Sr. et al. | |
| 9,213,929 B2 | 12/2015 | Tazaki et al. | |
| 9,213,991 B2 | 12/2015 | Bhardwaj et al. | |
| 9,333,787 B2 | 5/2016 | Cape et al. | |
| 9,364,920 B2 | 6/2016 | Costin et al. | |
| 2002/0120990 A1 * | 9/2002 | Kunitou | D06P 5/153 8/478 |
| 2002/0137417 A1 | 9/2002 | Tebbe | |
| 2002/0179580 A1 | 12/2002 | Costin | |
| 2003/0089782 A1 | 5/2003 | Reed | |
| 2004/0067706 A1 | 4/2004 | Woods | |
| 2005/0131571 A1 | 6/2005 | Costin | |
| 2006/0014099 A1 | 1/2006 | Faler et al. | |
| 2006/0090868 A1 | 5/2006 | Brownfield et al. | |
| 2007/0161304 A1 | 7/2007 | Wangbunyen | |
| 2007/0205541 A1 | 9/2007 | Allen et al. | |
| 2008/0023169 A1 | 1/2008 | Fernandes et al. | |
| 2008/0138543 A1 | 6/2008 | Hoshino et al. | |
| 2008/0153374 A1 | 6/2008 | Thiriot | |
| 2008/0280107 A1 | 11/2008 | Katschorek et al. | |
| 2009/0112353 A1 | 4/2009 | Kirefu et al. | |
| 2009/0162621 A1 | 6/2009 | Craamer et al. | |
| 2009/0266804 A1 | 10/2009 | Costin et al. | |
| 2010/0183822 A1 | 7/2010 | Ruggie et al. | |
| 2010/0279079 A1 | 11/2010 | Campbell et al. | |
| 2011/0101088 A1 | 5/2011 | Marguerettaz et al. | |
| 2011/0187025 A1 | 8/2011 | Costin, Sr. | |
| 2011/0261141 A1 | 10/2011 | Costin, Sr. et al. | |
| 2011/0295410 A1 | 12/2011 | Yamada et al. | |

(56) References Cited

U.S. PATENT DOCUMENTS

| | | | |
|---|---|---|---|
| 2012/0061470 A1 | 3/2012 | Marguerettaz et al. | |
| 2012/0182375 A1 | 7/2012 | Shourvarzi et al. | |
| 2012/0197429 A1 | 8/2012 | Nykyforov | |
| 2013/0000057 A1* | 1/2013 | Schoots | D06P 1/228 |
| | | | 8/494 |
| 2014/0342903 A1 | 11/2014 | Jarvis et al. | |
| 2015/0030821 A1 | 1/2015 | Costin, Sr. et al. | |
| 2015/0079359 A1 | 3/2015 | Costin, Jr. | |
| 2015/0106993 A1 | 4/2015 | Hoffman et al. | |
| 2015/0119238 A1 | 4/2015 | Pretsch et al. | |
| 2015/0121965 A1 | 5/2015 | Costin et al. | |
| 2015/0153278 A1 | 6/2015 | Erkelenz et al. | |
| 2015/0183231 A1 | 7/2015 | Costin, Sr. et al. | |
| 2015/0298253 A1 | 10/2015 | Constin, Jr. et al. | |
| 2015/0343568 A1 | 12/2015 | Constin, Jr. et al. | |
| 2015/0361597 A1 | 12/2015 | Candrian | |
| 2016/0016879 A1 | 1/2016 | Bertin et al. | |
| 2016/0060807 A1* | 3/2016 | Tharpe | B23K 26/352 |
| | | | 264/400 |
| 2016/0251782 A1 | 9/2016 | Liao et al. | |
| 2016/0263928 A1 | 9/2016 | Costin, Jr. et al. | |
| 2016/0361937 A1 | 12/2016 | Costin, Sr. et al. | |
| 2016/0362820 A1 | 12/2016 | Livecchi | |

FOREIGN PATENT DOCUMENTS

| | | |
|---|---|---|
| CN | 102371830 A | 3/2012 |
| CN | 102704215 A | 10/2012 |
| CN | 104687695 A | 6/2015 |
| CN | 204398442 U | 6/2015 |
| CN | 204653890 U | 9/2015 |
| CN | 104983103 A | 10/2015 |
| DE | 1965103 A1 | 7/1971 |
| DE | 3916126 A1 | 11/1990 |
| EP | 0328320 A1 | 8/1989 |
| EP | 1279460 A1 | 1/2003 |
| EP | 1459836 A2 | 9/2004 |
| ES | 2147473 A1 | 9/2000 |
| GB | 1259530 A | 1/1972 |
| GB | 1294116 A | 10/1972 |
| GB | 2199462 A | 7/1988 |
| GB | 2294656 A | 5/1996 |
| GB | 2448763 A | 10/2008 |
| JP | 11291368 A | 10/1999 |
| TW | M276842 U | 5/1994 |
| WO | 8202689 A1 | 8/1982 |
| WO | WO/2001/025824 | 4/2001 |
| WO | 0214077 A1 | 2/2002 |
| WO | 2004045857 A2 | 6/2004 |
| WO | 2008072853 A1 | 6/2008 |
| WO | 2010017648 A1 | 2/2010 |
| WO | 2011143471 A1 | 11/2011 |
| WO | 2012016316 A1 | 2/2012 |
| WO | 2013137836 A1 | 9/2013 |
| WO | WO/2015/042441 | 3/2015 |
| WO | 2016065134 A1 | 4/2016 |
| WO | WO/2018/035538 | 2/2018 |
| WO | WO/2018/112110 | 6/2018 |
| WO | WO/2018/112113 | 6/2018 |

OTHER PUBLICATIONS

Zhu et. al., "Image Editing with Generative Adversarial Networks | Two Minute Papers #101". Post on YouTube (Oct. 22, 2016) [online], [Retrieved on Feb. 7, 2016]. Retrieved from the Internet <URL: https://www.youtube.com/watch?v=pqkplfu36Os> Zhu et. al.

Roman, Homero Roman; Yang, Brandon; Zhang, Michelle, Photoshop 2.0: Generative Adversarial Networks for Photo Editing, Jul. 4, 2017, 8 pages, Stanford University.

International Search Report, PCT Application PCT/US2018/058597, dated Feb. 21, 2019, 5 pages.

Zhu, Jun-Yan; Krahenbuhl, Philipp; Shechtman, Eli; Efros, Alexei A., Generative Visual Manipulation on the Natural Image Manifold, Sep. 16, 2016, 16 pages, University of California, Berkeley, Adobe Research.

* cited by examiner

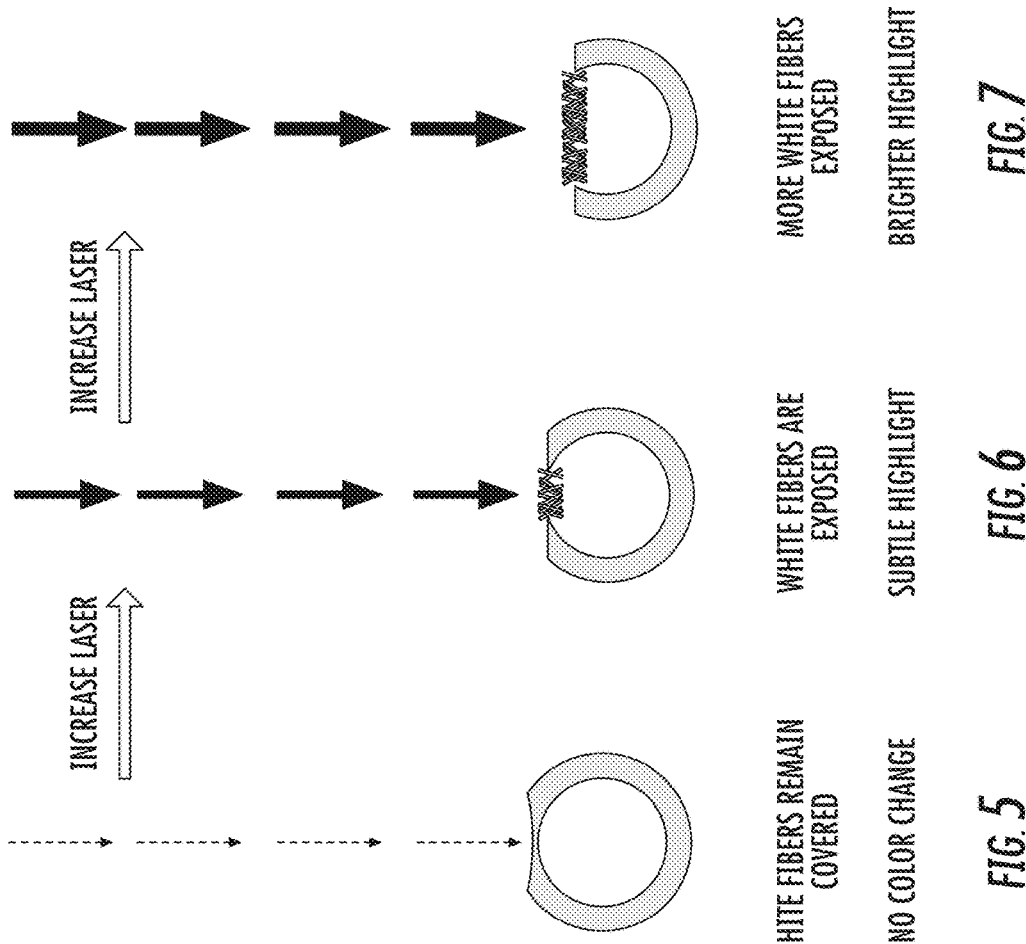
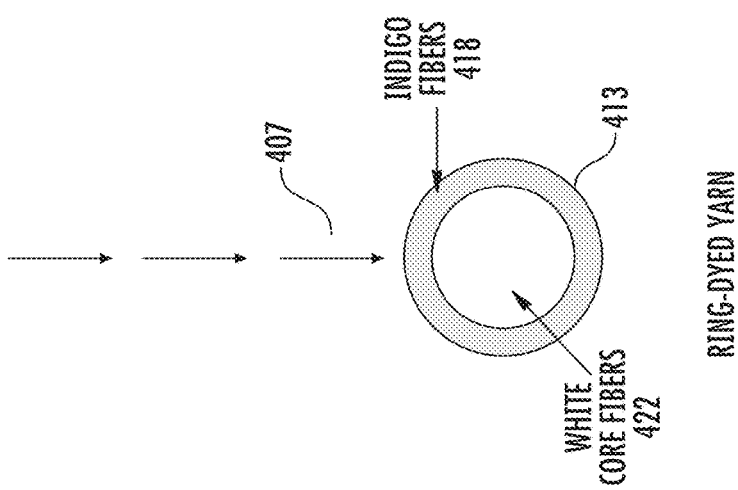

GARMENTS WITH FINISHING PATTERNS CREATED BY LASER AND NEURAL NETWORK

CROSS-REFERENCE TO RELATED APPLICATIONS

This patent application claims the benefit of U.S. patent application 62/579,867, filed Oct. 31, 2017, which is incorporated by reference along with all other references cited in this application.

BACKGROUND OF THE INVENTION

The present invention relates to apparel finishing and, more specifically, the use of a laser in the finishing of garments, especially denim including jeans, shirts, shorts, jackets, vests, and skirts, to obtain a faded, distressed, washed, or worn finish or appearance.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co. or LS&Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with a variety of wear patterns. The wear patterns have become part of the jeans style and fashion. Some examples of wear patterns include combs or honeycombs, whiskers, stacks, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take about 20 to 60 liters of water to finish each pair of jeans.

Therefore, there is a need for an improved process for finishing jeans that reduces environmental impact, processing time, and processing costs, while maintaining the look and style of traditional finishing techniques. Further there is a need for improved techniques of creating or extracting design features or wear patterns from existing garments to obtain corresponding laser input files.

BRIEF SUMMARY OF THE INVENTION

Software and lasers are used in finishing apparel to produce a desired wear pattern or other design. A technique includes using machine learning to create or extract a laser input file for wear pattern from an existing garment. A machine learning method may use a generative adversarial network, having both generative and discriminative neural nets that work together to translate an image of a garment to manufacturing inputs that will recreate it. The generative adversarial network model would then be trained with images of garments and the manufacturing inputs used to create them. This model is used to generate the laser input file from an image of the existing garment with the finishing pattern. With this laser input file, a laser can re-create the wear pattern from the existing garment onto a new garment. Another technique using a purely convolutional neural network architecture allows for the creation of novel garments by mixing the aesthetic.

Wear patterns and other designs on garments (including jeans and other denim garments) are reproduced by capturing digital images (e.g., high resolution digital photographs, potentially in a raw format) of existing garments exhibiting desirable wear patterns or other designs, processing the digital images using machine learning software (e.g., generative adversarial network), and then using the images generated by a model formed from the machine learning software as the patterns to control a laser to reproduce the desired pattern or design on a new garment. This process permits the reproduction of desirable, complex, and authentic wear patterns taken from worn garments such as jeans on new articles of clothing before sale.

In an implementation, a method includes: assembling a garment made from fabric panels of a woven first material having a warp with indigo ring-dyed cotton yarn, where the fabric panels are sewn together using thread; using a model formed through a machine learning having a generative adversarial network, creating a laser input file that is representative of a finishing pattern from an existing garment made from a second material, where the first material has a different fabric characteristic from the second material; and using a laser to create a finishing pattern on an outer surface of the garment based on the laser input file created by the model, where based on the laser input file, the laser removes selected amounts of material from the surface of the first material at different pixel locations of the garment, for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and the finishing pattern created can extend across portions of the garment where two or more fabric panels are joined together by the threads by exposing these portions to the laser.

In an implementation, a method includes: providing an assembled garment made from fabric panels of a woven first material including a warp having indigo ring-dyed cotton yarn, where the fabric panels are sewn together using thread; providing a laser input file that is representative of a finishing pattern from an existing garment made from a second material, where the finishing pattern on the existing garment was not created by a laser, and the laser input file was obtained by training a generative adversarial network having a generative neural net and a discriminative neural net, and forming a model from the generative adversarial network, where the model generates the laser input file for an image of the existing garment with the finishing pattern; and using a laser to create a finishing pattern on an outer surface of the assembled garment based on the laser input file, where based on the laser input file, the laser removes selected amounts of material from the surface of the first material at different pixel locations of the assembled garment, for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and the finishing pattern created can extend across portions of the assembled garment where two or more fabric panels are joined together by the threads by exposing these portions to the laser.

In an implementation, a method includes: assembling a jean made from fabric panels of a woven first denim material including a warp having indigo ring-dyed cotton yarn, where the fabric panels are sewn together using thread; creating a laser input file that is representative of a finishing pattern from an existing jean made from a second denim material, where the first denim material includes a different fabric characteristic from the second denim material, and the creating the laser input file includes using machine learning to form a model, where the model generates the laser input file for an image of the existing garment with the finishing pattern; and using a laser to create a finishing pattern on an outer surface of the jean based on the laser input file, where based on the laser input file, the laser removes selected amounts of material from the surface of the first material at different pixel locations of the jean, for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed, and the finishing pattern created can extend across portions of the jean where two or more fabric panels are joined together by the threads by exposing these portions to the laser.

In an implementation, a method includes: providing an assembled garment made from fabric panels of a woven first material with a warp having indigo ring-dyed cotton yarn, where the fabric panels are sewn together using thread; and providing a laser input file that is representative of a finishing pattern from an existing garment made from a second material, where the finishing pattern on the existing garment was not created by a laser. The laser input file was obtained by: providing sample laser input files and images of sample garments with lasered finishing patterns resulting from the sample laser input files to a generative adversarial network, where the sample laser input files are real laser input files for the generative adversarial network; using a generative neural net of the generative adversarial network, generating fake laser input files for the images of sample garments with lasered finishing patterns; determining a generator loss based on the fake laser input files and real laser input files; inputting the real laser input files to a real discriminator of the generative adversarial network; inputting the real laser input files and the fake laser input files to a fake discriminator of the generative adversarial network; determining a discriminator loss based on outputs of the real discriminator and fake discriminator; and based on outputs of the generator loss and discriminator loss, iteratively training a model to obtain final model, where the final model generates the laser input file for an image of the existing garment with the finishing pattern.

A laser is used to create a finishing pattern on an outer surface of the assembled garment based on the laser input file form the final model. Based on the laser input file, the laser removes selected amounts of material from the surface of the first material at different pixel locations of the assembled garment. For lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed. The finishing pattern created can extend across portions of the assembled garment where two or more fabric panels are joined together by the threads by exposing these portions to the laser.

In an implementation, a garment includes: fabric panels made from a woven first material with a warp having dyed cotton yarn, where the fabric panels are sewn together using thread; and an outer surface of the garment includes a finishing pattern created by a laser based on a laser input file. The laser input file includes digital data that is representative of a finishing pattern from an existing garment made from a second material. The first material has a different fabric characteristic from the second material. The laser input file is created by providing sample laser input files and images of sample garments with lasered finishing patterns resulting from the sample laser input files to a generative adversarial network, where the sample laser input files are real laser input files for the generative adversarial network; using a generative neural net of the generative adversarial network, generating fake laser input files for the images of sample garments with lasered finishing patterns; determining a generator loss based on the fake laser input files and real laser input files; inputting the real laser input files to a real discriminator of the generative adversarial network; inputting the real laser input files and the fake laser input files to a fake discriminator of the generative adversarial network; determining a discriminator loss based on outputs of the real discriminator and fake discriminator; and based on outputs of the generator loss and discriminator loss, iteratively training a model to obtain final model, where the final model generates the laser input file for an image of the existing garment with the finishing pattern.

In an implementation, a garment includes: fabric panels made from a woven first material with a warp having dyed cotton yarn, where the fabric panels are sewn together using thread; and an outer surface of the garment includes a finishing pattern created by a laser based on a laser input file. The laser input file includes digital data that is representative of a finishing pattern from an existing garment made from a second material. The first material has a different fabric characteristic from the second material. The laser input file is created by training a generative adversarial network comprising a generative neural net and a discriminative neural net, and forming a model from the generative adversarial network, where the model generates the laser input file for an image of the existing garment with the finishing pattern.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4-7 show how the laser alters the color of ring-dyed yarn. FIG. 4 shows a laser beam striking a ring-dyed yarn having indigo-dyed fibers and white core fibers. FIG. 5 shows the laser using a first power level setting or first exposure time setting, or a combination of these, to remove some of the dyed fibers, but not revealing any of the white core fibers. FIG. 6 shows the laser using a second power level setting or second exposure time setting, or a combination of these, to remove more of the dyed fibers than in FIG. 5. FIG. 7 shows the laser using a third power level setting or third exposure time setting, or a combination of these, to remove even more of the dyed fibers than in FIG. 6.

FIG. 19A shows a first portion of a generator of a generative adversarial neural network. FIG. 19B shows a second portion of the generator of the generative adversarial neural network. FIG. 19C shows a third portion of the generator of the generative adversarial neural network.

FIG. 20A shows a first portion of a generator of a generative adversarial neural network. FIG. 20B shows a second portion of the generator of the generative adversarial neural network. FIG. 20C shows a third portion of the generator of the generative adversarial neural network.

DETAILED DESCRIPTION OF THE INVENTION

Figure 1:
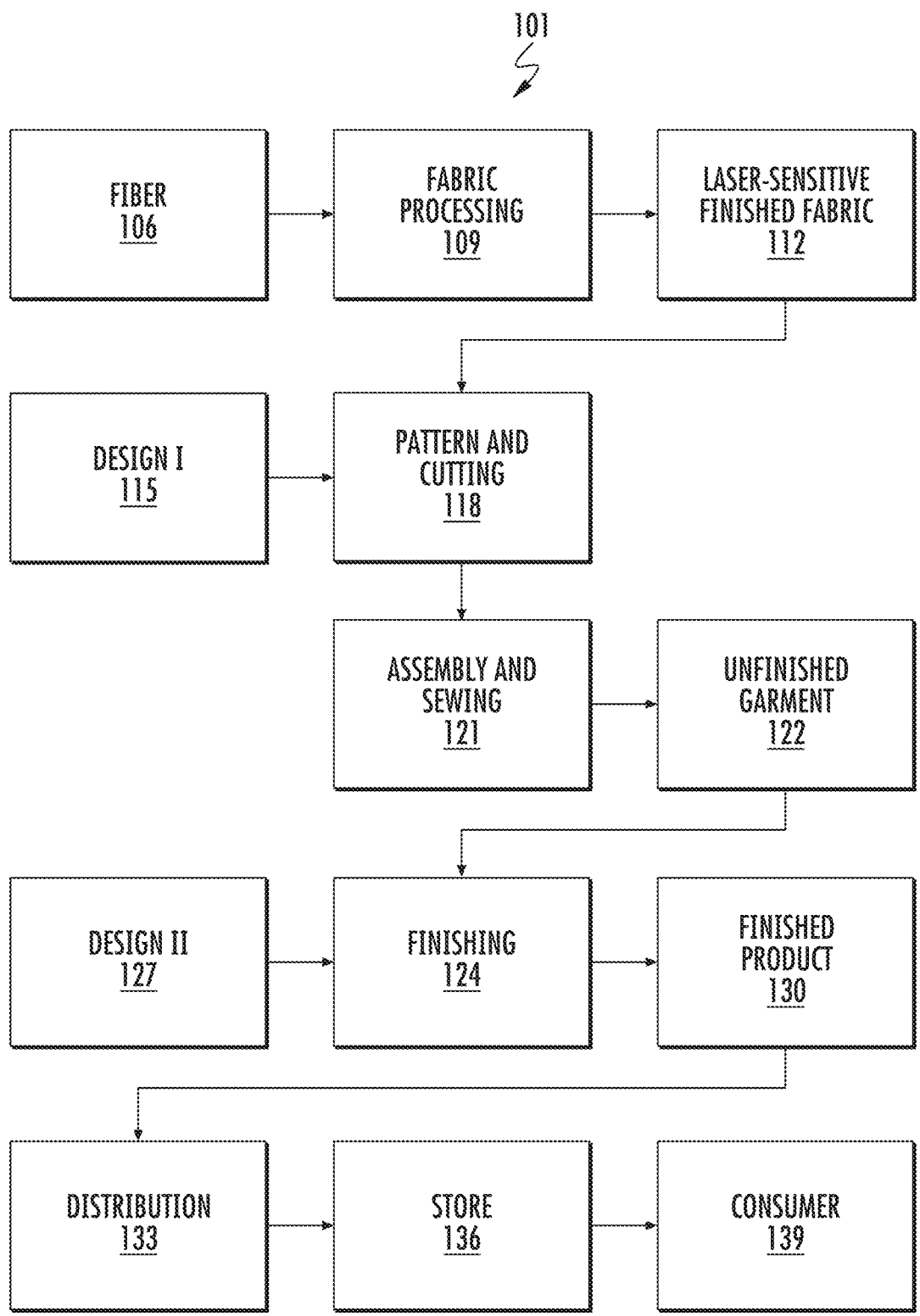
FIG. 1 shows a block diagram of a system for creating, designing, producing apparel products with laser finishing.

FIG. 1 shows a process flow 101 for manufacturing apparel such as jeans, where garments are finished using a laser. The fabric or material for various apparel including jeans is made from natural or synthetic fibers 106, or a combination of these. A fabric mill takes fibers and processes 109 these fibers to produce a laser-sensitive finished fabric 112, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandax), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The yarns (e.g., warp yarns) are dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including nondenim products and products made from knit materials. Some examples include T-shirts, sweaters, coats, sweatshirts (e.g., hoodies), casual wear, athletic wear, outerwear, dresses, evening wear, sleepwear, loungewear, underwear, socks, bags, backpacks, uniforms, umbrellas, swimwear, bed sheets, scarves, and many others.

A manufacturer creates a design 115 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 118 based on the design. The pattern pieces are assembled together 121 into the garment, typically by sewing, but can be joined together using other techniques (e.g., rivets, buttons, zipper, hoop and loop, adhesives, or other techniques and structures to join fabrics and materials together).

Some garments can be complete after assembly and ready for sale. However, other garments are unfinished 122 and have additional finishing 124, which includes laser finishing. The finishing may include tinting, washing, softening, and fixing. For distressed denim products, the finishing can include using a laser to produce a wear pattern according to a design 127 (design II). Some additional details of laser finishing are described in U.S. patent applications 62/377, 447, filed Aug. 19, 2016, and Ser. No. 15/682,507, filed Aug. 21, 2017, issued as U.S. Pat. No. 10,051,905 on Aug. 21, 2018, are incorporated by reference along with all other references cited in this application.

Design 127 is for postassembly aspects of a garment while design 115 is for preassembly aspects of a garment. After finishing, a finished product 130 (e.g., a pair of jeans) is complete and ready for sale. The finished product is inventoried and distributed 133, delivered to stores 136, and sold to consumers or customers 139. The consumer can buy and wear worn blue jeans without having to wear out the jeans themselves, which usually takes significant time and effort.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expense, and impact the environment by utilizing resources and producing waste. It is desirable to reduce water and chemical usage, which can include eliminating the use agents such as potassium permanganate and pumice. An alternative to these traditional finishing approaches is laser finishing.

Figure 2:
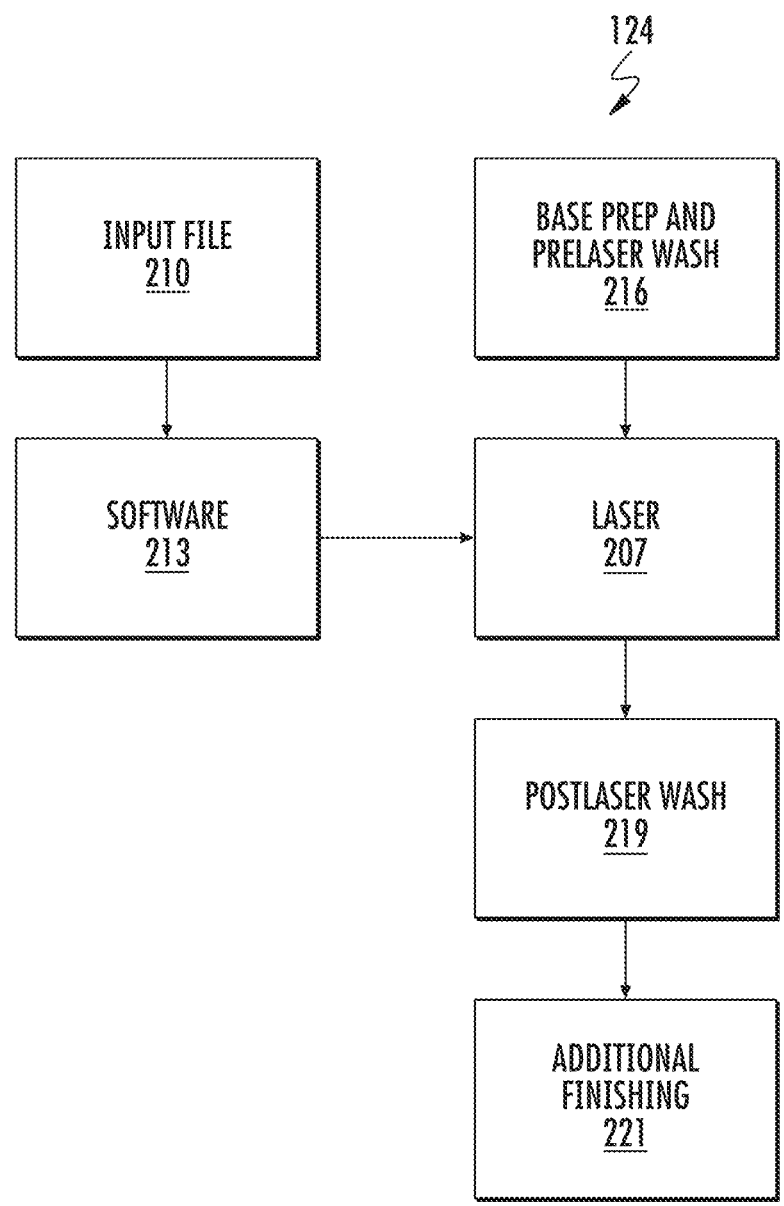
FIG. 2 shows a flow for a finishing technique that includes the use of a laser.

FIG. 2 shows a finishing technique that includes the use of a laser 207. A laser is a device that emits light through a process of optical amplification based on the stimulated emission of electromagnetic radiation. Lasers are used for bar code scanning, medical procedures such as corrective eye surgery, and industrial applications such as welding. A particular type of laser for finishing apparel is a carbon dioxide laser, which emits a beam of infrared radiation.

The laser is controlled by an input file 210 and control software 213 to emit a laser beam onto fabric at a particular position or location at a specific power level for a specific amount of time. Further, the power of the laser beam can be varied according to a waveform such as a pulse wave with a particular frequency, period, pulse width, or other characteristic. Some aspects of the laser that can be controlled include the duty cycle, frequency, marking or burning speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," or "burns" a wear pattern (specified by input file 210) onto the garment. The fabric that is exposed to the laser beam (e.g., infrared beam) changes color, lightening the fabric at a specified position by a certain amount based on the laser power, time of exposure, and waveform used. The laser continues from position to position until the wear pattern is completely printed on the garment.

In a specific implementation, the laser has a resolution of about 34 dots per inch (dpi), which on the garment is about 0.7 millimeters per pixel. The technique described in this patent is not dependent on the laser's resolution, and will work with lasers have more or less resolution than 34 dots per inch. For example, the laser can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution can be increased. In an implementation, multiple laser passes are used.

Jeans are dyed using an indigo dye, which results in a blue colored fabric. The blue color is caused by chromophores trapped in the fabric which reflect light as a blue color. U.S. patent application 62/433,739, filed Dec. 13, 2016, which is incorporated by reference, describes a denim material with enhanced response characteristics to laser finishing. Using a denim material made from indigo ring-dyed yarn, variations in highs and lows in indigo color shading is achieved by using a laser.

Figure 3:
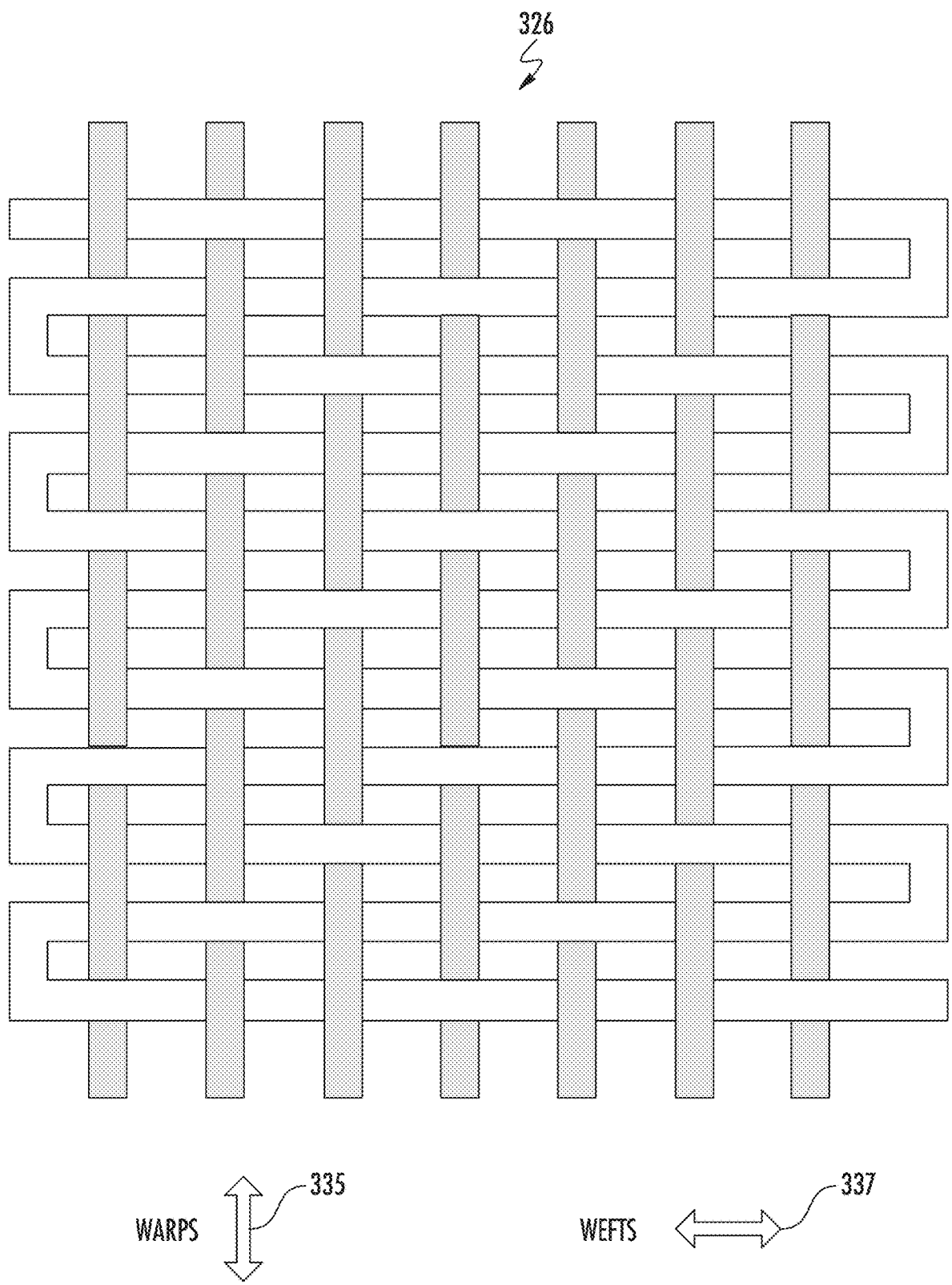
FIG. 3 shows a weave pattern for a denim fabric.

FIG. 3 shows a weave pattern of a denim fabric 326. A loom does the weaving. In weaving, warp is the lengthwise or longitudinal yarn or thread in a roll, while weft or woof is the transverse thread. The weft yarn is drawn through the warp yarns to create the fabric. In FIG. 3, the warps extend in a first direction 335 (e.g., north and south) while the wefts extend in a direction 337 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn is used for the warp, and undyed or white yarn is typically used for the weft yarn. In some denim fabrics, the weft yarn can be dyed and have a color other than white, such as red. In the denim weave, the weft passes under two or more warp threads. FIG. 3 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from an lower right to an upper left. But in other denim weaves, the weft can pass under a different number of warp threads, such as 3, 4, 5, 6, 7, 8, or more. In other implementation, the denim is a 3×1 right-hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, elastane to allow for warp stretch. And some yarns for other fabrics may contain other fibers, such as polyester or elastane as examples.

In an indigo ring-dyed yarn, the indigo does not fully penetrate to a core of the yarn. Rather, the indigo dye is applied at a surface of the cotton yarn and diffuses toward the interior of the yarn. So when the yarn is viewed cross-sectionally, the indigo dyed material will appear as a ring on around an outer edge of the yarn. The shading of the indigo dye will generally lighten in a gradient as a distance increases from the surface of the yarn to the center (or core) of the yarn.

During laser finishing, the laser removes a selected amount of the surface of the indigo dyed yarn (e.g., blue color) to reveal a lighter color (e.g., white color) of the inner core of the ring-dyed yarn. The more of the indigo dyed material that is removed, the lighter the color (e.g., lighter shade of blue). The more of the indigo dyed material that remains, the darker the color (e.g., deeper shade of blue). The laser can be controlled precisely to remove a desired amount of material to achieve a desired shade of blue in a desired place or position on the material.

With laser finishing, a finish can be applied (e.g., printed or burned via the laser) onto apparel (e.g., jeans and denim garments) that will appear similar to or indistinguishable from a finish obtained using traditional processing techniques (e.g., dry abrasion, wet processing, and oxidation). Laser finishing of apparel is less costly and is faster than traditional finishing techniques and also has reduced environmental impact (e.g., eliminating the use of harsh chemical agents and reducing waste).

FIGS. 4-7 show how the laser alters the color of ring-dyed yarn. FIG. 4 shows a laser beam 407 striking a ring-dyed yarn 413 having indigo-dyed fibers 418 and white core fibers 422. The laser removes the dyed fibers, which can be by vaporizing or otherwise destroying the cotton fiber via heat or high temperature that the laser beam causes. Before lasering, a cross section of the warp of the target garment comprises a generally round shape.

FIG. 5 shows the laser using a first power level setting or first exposure time setting, or a combination of these, to remove some of the dyed fibers, but not revealing any of the white core fibers. The undyed fibers remain covered. There is no color change. After being exposed to the laser and the depth of material that has been removed, a cross section of the warp comprises a region with a flattened shape relative to the generally round shape before lasering.

FIG. 6 shows the laser using a second power level setting or second exposure time setting, or a combination of these, to remove more of the dyed fibers than in FIG. 5. The second power level is greater than the first power level, or the second exposure time setting is greater than the first exposure time setting, or a combination of these. The result is some of the undyed fibers are revealed. There is a color change, subtle highlighting. As for FIG. 5, after being exposed to the laser and the depth of material that has been removed, a cross section of the warp comprises a region with a flattened shape relative to the generally round shape before lasering.

FIG. 7 shows the laser using a third power level setting or third exposure time setting, or a combination of these, to remove even more of the dyed fibers than in FIG. 6. The third power level is greater than the second power level, or the third exposure time setting is greater than the second exposure time setting, or a combination of these. The result is more of the undyed fibers are revealed. There is a color change, brighter highlighting. As for FIGS. 5 and 6, after being exposed to the laser and the depth of material that has been removed, a cross section of the warp comprises a region with a flattened shape relative to the generally round shape before lasering.

As shown in FIG. 2, before laser 207, the fabric can be prepared 216 for the laser, which may be referred to as a base preparation, and can include a prelaser wash. This step helps improves the results of the laser. After the laser, there can be a postlaser wash 219. This wash can clean or remove any residue caused by the laser, such as removing any charring (which would appear as brown or slightly burned). There can be additional finish 221, which may be including tinting, softening, or fixing, to complete finishing.

Figure 8:
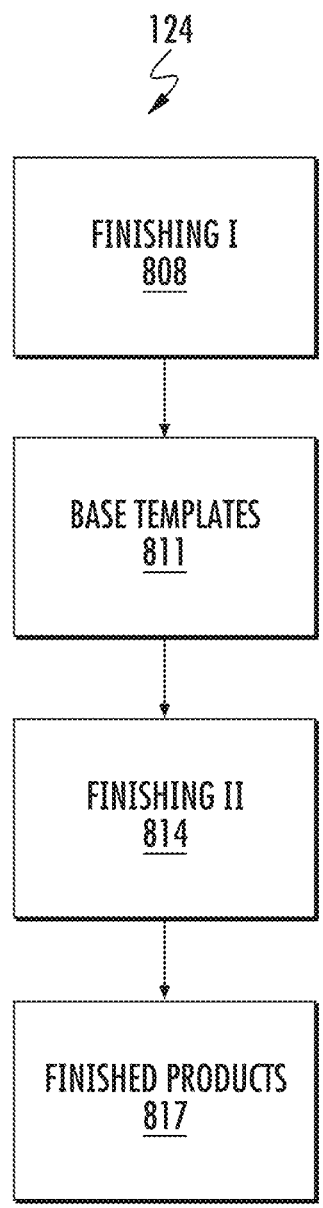
FIG. 8 shows a flow for finishing in two finishing steps and using base templates.

FIG. 8 shows a technique where finishing 124 is divided into two finishing steps, finishing I and finishing II. Finishing I 808 is an initial finishing to create base templates 811. With finishing II 814, each base template can be used to manufacture multiple final finishes 817.

Figure 9:
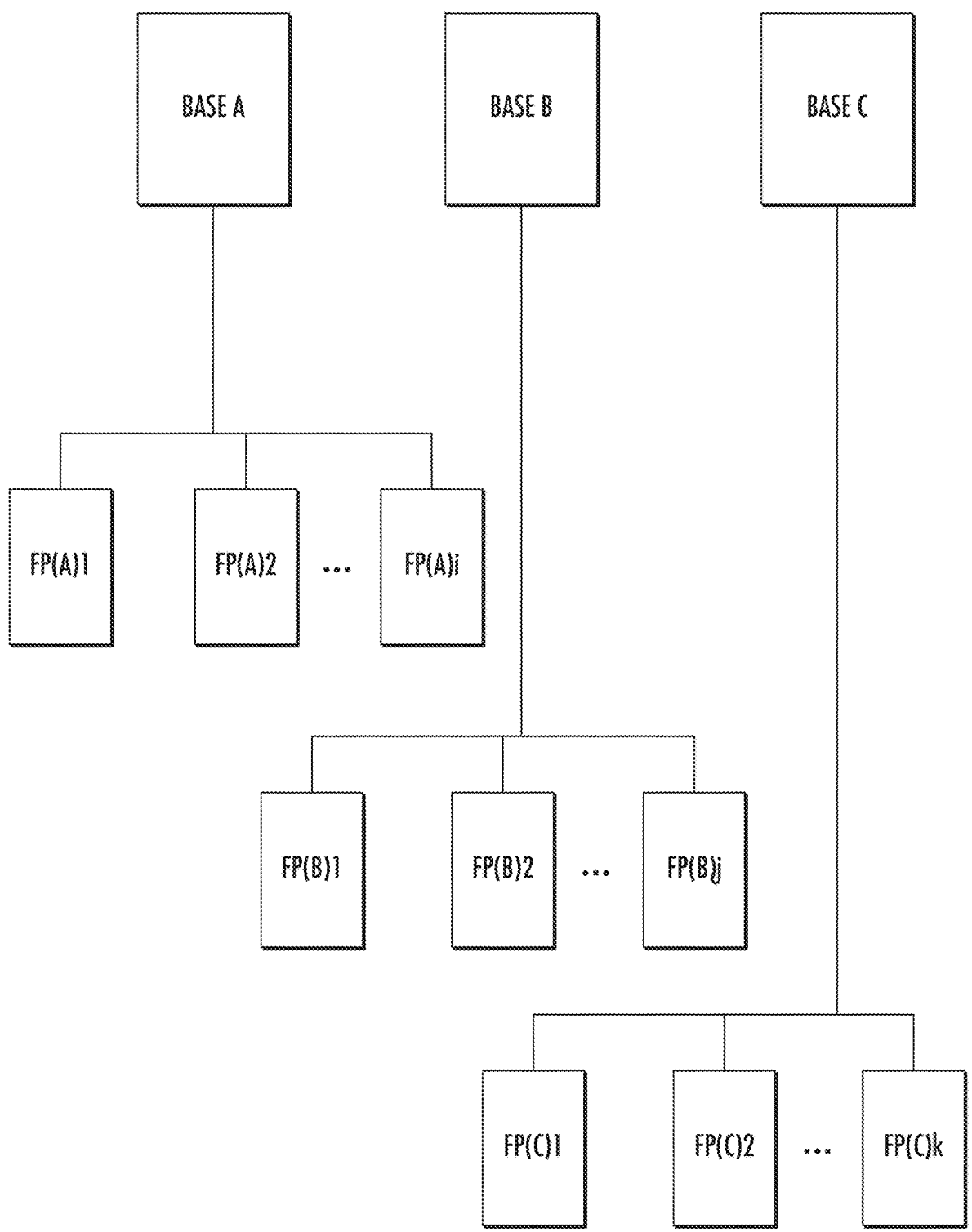
FIG. 9 shows multiple base templates and multiple resulting finished products from each of these templates.

FIG. 9 shows multiple base templates, base A, base B, and base C. These base templates may be referred to as base fit fabrics or BFFs. In an implementation, the base templates can be created during base prep and prelaser wash 216 (see FIG. 2). During finishing I, by using different wash 216 methods or recipes, each different base template can be created.

Finishing II can include laser finishing. Base A is lasered with different designs to obtain various final product based on base A (e.g., FP(A)1 to FP(A)i, where i is an integer). Base B is lasered with different designs to obtain various final product based on base B (e.g., FP(B)1 to FP(B)j, where j is an integer). Base C is lasered with different designs to obtain various final product based on base C (e.g., FP(C)1 to FP(C)k, where k is an integer). Each base can be used to obtain a number of different final designs. For example, the integers i, j, and k can have different values.

As described above and shown in FIG. 2, after finishing II, there can be additional finishing during post laser wash 219 and additional finishing 221. For example, during the postlaser wash, there may be additional tinting to the lasered garments. This tinting can result in an overall color cast to change the look of the garment.

In an implementation, laser finishing is used to create many different finishes (each a different product) easily and quickly from the same fabric template or BFF or "blank." For each fabric, there will be a number of base fit fabrics. These base fit fabrics are lasered to produce many different finishes, each being a different product for a product line. Laser finishing allows greater efficiency because by using fabric templates (or base fit fabrics), a single fabric or material can be used to create many different products for a product line, more than is possible with traditional processing. This reduces the inventory of different fabric and finish raw materials.

For a particular product (e.g., 511 product), there can be two different fabrics, such as base B and base C of FIG. 9. The fabrics can be part of a fabric tool kit. For base B, there are multiple base fit fabrics, FP(B)1, FP(B)2, and so forth. Using laser finishing, a base fit fabric (e.g., FP(B)1) can be used to product any number of different finishes (e.g., eight different finishes), each of which would be considered a different product model.

For example, FP(B)1 can be laser finished using different laser files (e.g., laser file 1, laser file 2, laser file 3, or others) or have different postlaser wash (e.g., postlaser wash recipe 1, postlaser wash recipe 2, postlaser wash recipe 3, or others), or any combination of these. A first product would be base fit fabric FP(B)1 lasered using laser file 1 and washed using postlaser wash recipe 1. A second product would be base fit fabric FP(B)1 lasered using laser file 2 and washed using postlaser wash recipe 1. A third product would be base fit fabric FP(B)1 lasered using laser file 2 and washed using postlaser wash recipe 2. And there can be many more products based on the same base fit fabric. Each can have a different product identifier or unique identifier, such as a different PC9 or nine-digit product code.

With laser finishing, many products or PC9s are produced for each base fit fabric or blank. Compared to traditional processing, this is a significant improvement in providing greater numbers of different products with less different fabrics and finishes (each of which in traditional processing consume resources, increasing cost, and take time). Inventory is reduced. The technique of providing base fit finishes or fabric templates for laser finishing has significant and many benefits.

Figure 10:
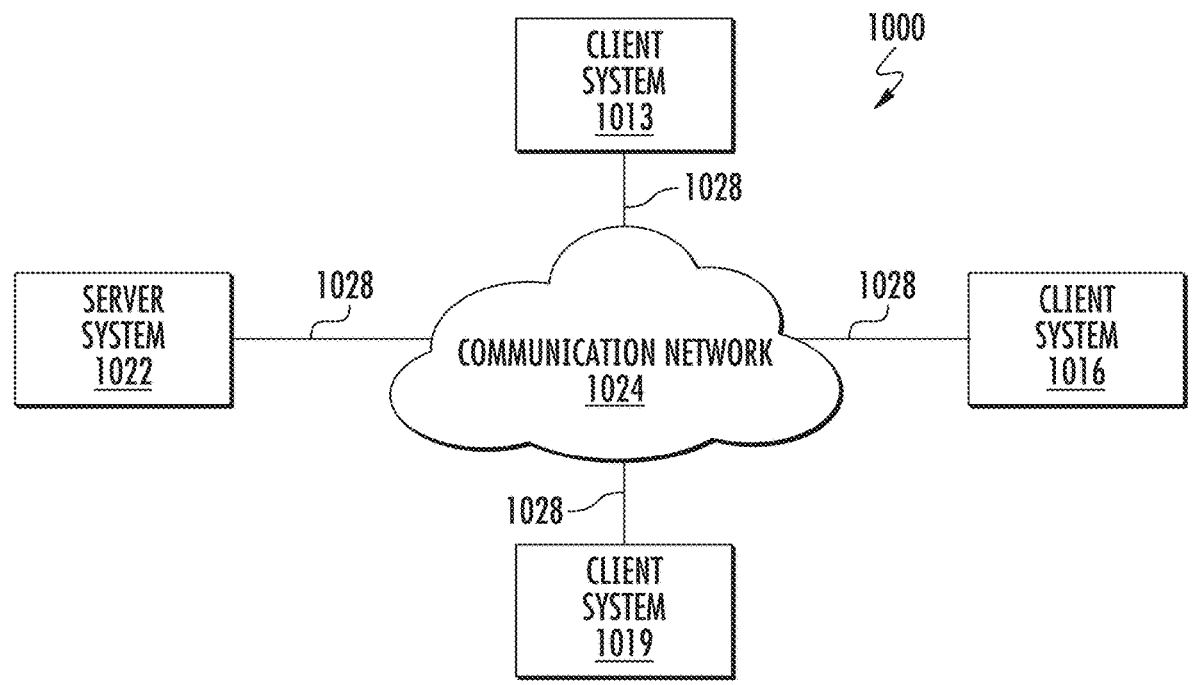
FIG. 10 shows a distributed computer network.

A system incorporating laser finishing can include a computer to control or monitor operation, or both. FIG. 10 shows an example of a computer that is component of a laser finishing system. The computer may be a separate unit that is connected to a system, or may be embedded in electronics of the system. In an embodiment, the invention includes software that executes on a computer workstation system or server, such as shown in FIG. 10.

FIG. 10 is a simplified block diagram of a distributed computer network 1000 incorporating an embodiment of the present invention. Computer network 1000 includes a number of client systems 1013, 1016, and 1019, and a server system 1022 coupled to a communication network 1024 via a plurality of communication links 1028. Communication network 1024 provides a mechanism for allowing the various components of distributed network 1000 to communicate and exchange information with each other.

Communication network 1024 may itself be comprised of many interconnected computer systems and communication links. Communication links 1028 may be hardwire links, optical links, satellite or other wireless communications links, wave propagation links, or any other mechanisms for communication of information. Communication links 1028 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 10. These communication protocols may include VLAN, MPLS, TCP/IP, Tunneling, HTTP protocols, wireless application protocol (WAP), vendor-specific protocols, customized protocols, and others. While in one embodiment, communication network 1024 is the Internet, in other embodiments, communication network 1024 may be any suitable communication network including a local area network (LAN), a wide area network (WAN), a wireless network, an intranet, a private network, a public network, a switched network, and combinations of these, and the like.

Distributed computer network 1000 in FIG. 10 is merely illustrative of an embodiment incorporating the present invention and does not limit the scope of the invention as recited in the claims. One of ordinary skill in the art would recognize other variations, modifications, and alternatives. For example, more than one server system 1022 may be connected to communication network 1024. As another example, a number of client systems 1013, 1016, and 1019 may be coupled to communication network 1024 via an access provider (not shown) or via some other server system.

Client systems 1013, 1016, and 1019 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 1022 is responsible for receiving information requests from client systems 1013, 1016, and 1019, performing processing required to satisfy the requests, and for forwarding the results corresponding to the requests back to the requesting client system. The processing required to satisfy the request may be performed by server system 1022 or may alternatively be delegated to other servers connected to communication network 1024.

Client systems 1013, 1016, and 1019 enable users to access and query information stored by server system 1022. In a specific embodiment, the client systems can run as a standalone application such as a desktop application or mobile smartphone or tablet application. In another embodiment, a "Web browser" application executing on a client system enables users to select, access, retrieve, or query information stored by server system 1022. Examples of Web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 11:
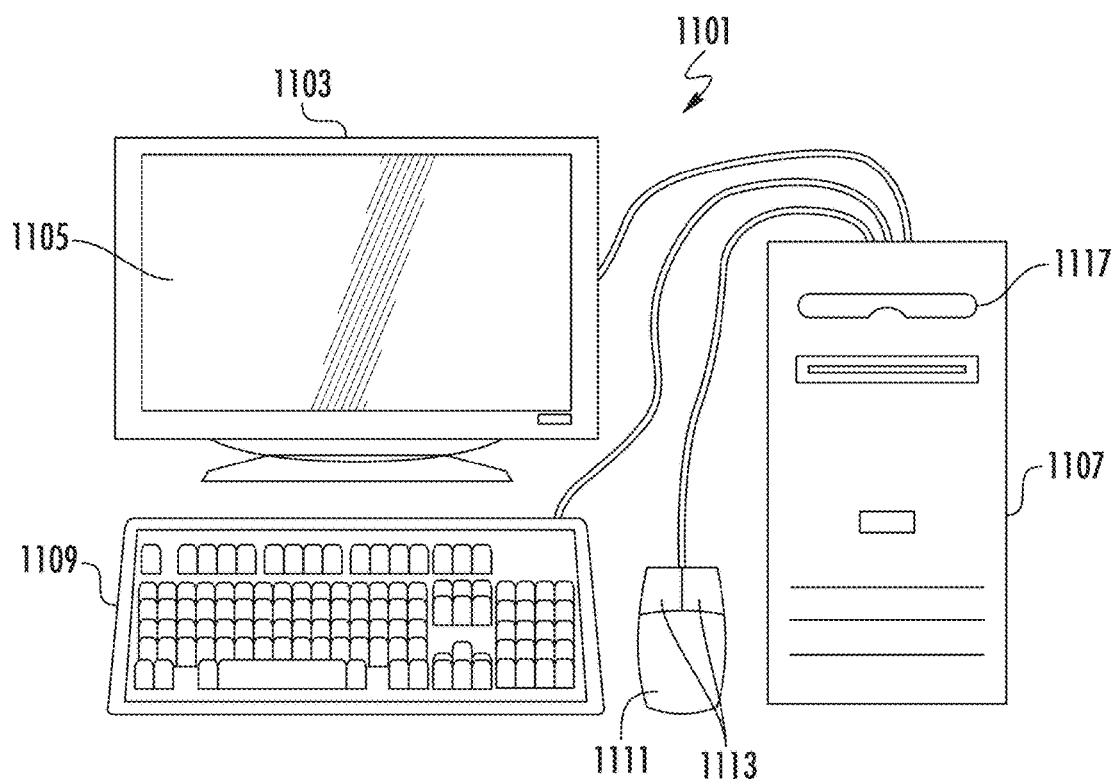
FIG. 11 shows a computer system that can be used in laser finishing.

FIG. 11 shows an exemplary client or server system of the present invention. In an embodiment, a user interfaces with the system through a computer workstation system, such as shown in FIG. 11. FIG. 11 shows a computer system 1101 that includes a monitor 1103, screen 1105, enclosure 1107 (may also be referred to as a system unit, cabinet, or case), speaker (not shown), keyboard or other human input device 1109, and mouse or other pointing device 1111. Mouse 1111 may have one or more buttons such as mouse buttons 1113.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 8, iPhone XS, or iPhone XS Max), Apple iPad (e.g., Apple iPad, Apple iPad Pro, or Apple iPad mini), Apple iPod (e.g, Apple iPod Touch), Samsung Galaxy product (e.g., Galaxy S series product or Galaxy Note series product), Google Nexus and Pixel devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 1107 houses familiar computer components, some of which are not shown, such as a processor, memory, mass storage devices 1117, and the like. Mass storage devices 1117 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 1117. The source code of the software of the present invention may also be stored or reside on mass storage device 1117 (e.g., hard disk, magnetic disk, tape, or CD-ROM). As a further example, code of the invention may be transmitted via wires, radio waves, or through a network such as the Internet.

Figure 12:
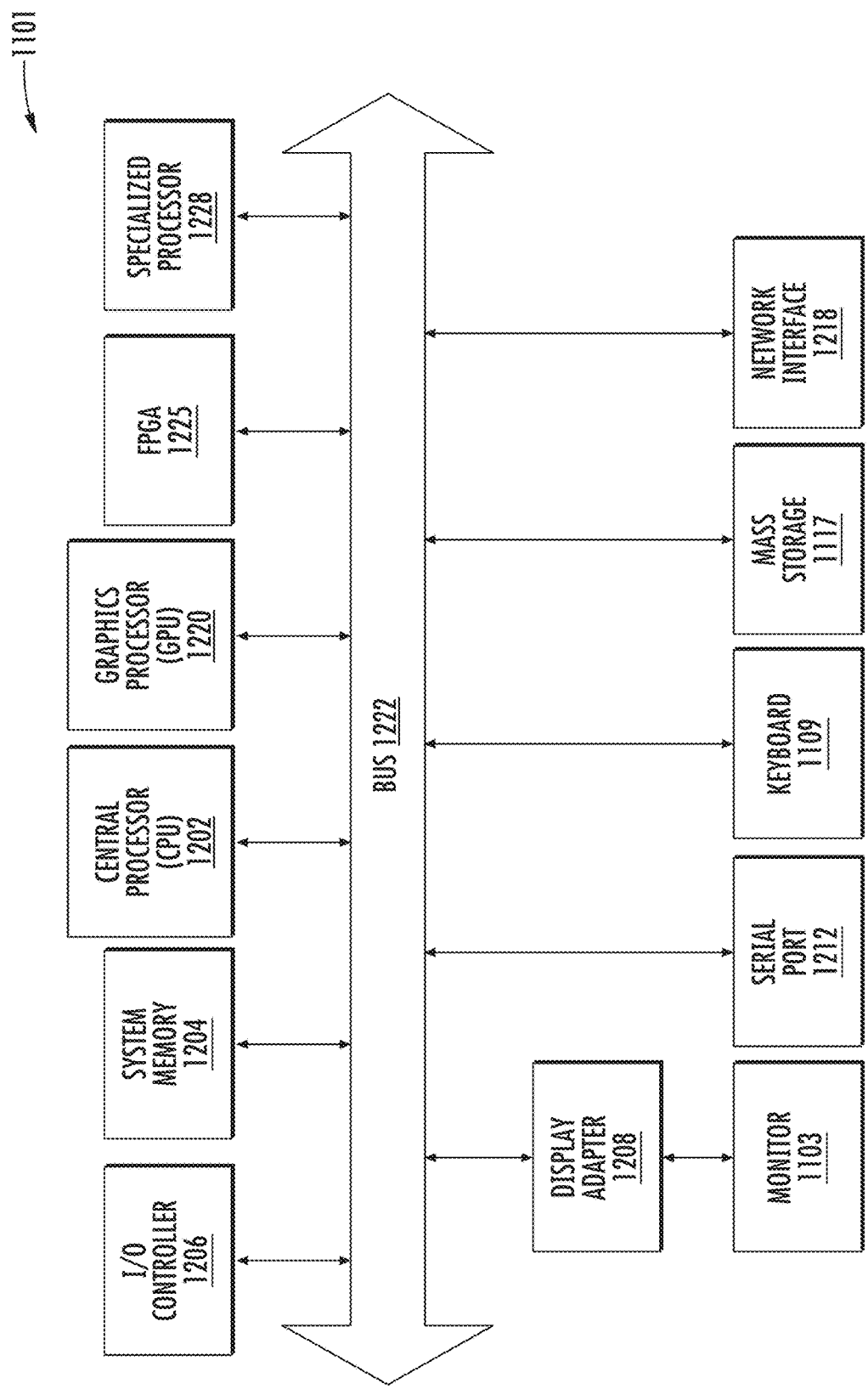
FIG. 12 shows a system block diagram of the computer system.

FIG. 12 shows a system block diagram of computer system 1101 used to execute the software of the present invention. As in FIG. 11, computer system 1101 includes monitor 1103, keyboard 1109, and mass storage devices 1117. Computer system 1101 further includes subsystems such as central processor (CPU) 1202, system memory 1204, input/output (I/O) controller 1206, display adapter 1208, serial or universal serial bus (USB) port 1212, network interface 1218, graphics processor (GPU) 1220, field programmable gate array (FPGA) 1225, and specialized processor 228 (e.g., ASIC, physics processor, digital signal processor (DSP), or other processor). The invention may also be used with computer systems with additional or fewer subsystems. For example, a computer system could include more than one processor 1202 (i.e., a multiprocessor system) or a system may include a cache memory.

The computer system may include any number of graphics processors. The graphics processor may reside on the motherboard such as being integrated with the motherboard chipset. One or more graphics processors may reside on external boards connected to the system through a bus such as an ISA bus, PCI bus, AGP port, PCI Express, or other system buses. Graphics processors may on separate boards, each connected to a bus such as the PCI Express bus and to each other and to the rest of the system. Further, there may be a separate bus or connection (e.g., Nvidia SLI or ATI CrossFire connection) by which the graphics processors may communicate with each other. This separate bus or connection may be used in addition to or in substitution for system bus.

The processor, CPU or GPU, or both, may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network. Multiple processors (e.g., CPU, GPU, FPGA, and other specialized processors, in any combination) can be utilized on multiple, different machines connected by the network. These machines that perform the computation in parallel may connected through the Internet (or Cloud) using a paradigm known as Cloud computing.

Arrows such as 1222 represent the system bus architecture of computer system 1101. However, these arrows are illustrative of any interconnection scheme serving to link the subsystems. For example, GPU 1220 could be connected to the other subsystems through a port or have an internal direct connection to central processor 1202. The processor may include multiple processors or a multicore processor, which may permit parallel processing of information. Computer system 1101 shown in FIG. 12 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, ixRDD, and EV-DO). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download Web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a Web application from one or more servers using a network connection with the server or servers and load the Web application in a Web browser. For example, a Web application can be downloaded from an application server over the Internet by a Web browser. Nonnative applications can also be obtained from other sources, such as a disk.

Machine learning is used in apparel design to create realistic patterns and designs (e.g., wear pattern) on apparel. A realistic appearing pattern refers to a pattern that a person would not be able to (or would be difficult to) discriminate as being a fake (e.g., generated or manufactured artificially by a computer).

Machine learning is a field of computer science, and in particular, artificial intelligence (AI), that gives computers the ability to automatically learn and improve from experience without being explicitly programmed. Machine learning can utilize an artificial neural network (or simply, a neural net) that is based on a collection of connected units called artificial neurons.

Machine learning algorithms can be categorized as supervised or reinforcement learning type algorithms. Supervised machine learning algorithms can apply what has been learned in the past to new data using labeled examples to predict future events. Starting from the analysis of a known training dataset, the learning algorithm produces an inferred function to make predictions about the output values. The system is able to provide targets for any new input after sufficient training. The learning algorithm can also compare its output with the correct, intended output and find errors in order to modify the model accordingly.

Unsupervised machine learning algorithms are used when the information used to train is neither classified nor labeled. Unsupervised learning studies how systems can infer a function to describe a hidden structure from unlabeled data. The system does not figure out the right output, but it explores the data and can draw inferences from datasets to describe hidden structures from unlabeled data.

In an implementation, machine learning and artificial neural network computations for apparel design are executed on a hardware or software system, or combination, comprising one or more specialized processing units. Examples of the specialized processing units include central processing units (CPUs), graphical processing units (GPUs), physics processors, cell processors, digital signal processors (DSPs), field programmable gate arrays (FPGAs), application specific integrated circuits (ASICs), and the like. Portions of the neural computational task for apparel design may be transformed into the form of mathematical manipulations. GPUs may be particularly well suited to performing such operations.

In this application, GPUs are used as an example of a specialized processor, but this is not intended to limit the scope of the teaching of this patent to GPUs. A neural net may utilize any of the specialized processors mentioned previously, and other substantially similar processors as understood by those having ordinary skills in the art and as similar or related processors may be developed later. An interface facilitating a neural net may be at least one of a PCI Express bus, AGP bus, front side bus, Ethernet, the Internet, or other interface that facilitates the transfer of data in any form including serial or parallel.

An alternative hardware configuration includes a cooperative collection of specialized processing units where each processing unit may be well suited for a specific type of computation. This hardware configuration will be defined here as a "heterogeneous configuration" meaning that the various computational tasks are executed by different, typically specialized, processors. As an example, GPUs are designed specifically for high throughput on specialized types of problems found in graphics processing that require a large number of arithmetic calculations with a relatively small number of memory access steps. Other specialized processors may be designed to handle other types of data or computational problems. Allocating the various portions of the neural net computations to specialized processors may improve the throughput, increase the efficiency, lower the cost, and improve the results of the computation.

GPUs may be designed for fast graphics processing. The data may be organized into a stream where a stream is an ordered set of data of the same data type. Operations, procedures, methods, algorithms, and the like that may be applied to entire streams of data are typically called kernels. Kernels are very efficient because they depend only on their input. Internal computations within the kernel are independent of other elements of the stream. Therefore, GPUs may be designed for parallel processing, memory efficiency, and high throughput for specific problems.

GPUs typically have hardware blocks that may be specifically designed for certain types of problems (e.g., specific kernels may be implemented in hardware). As an example, hardware blocks may be designed to implement various types of vector or matrix computations, or both. As an example, graphics data is typically four-dimensional referring to the channel value of the red, green, and blue pixels (referred to as RGB) and the opacity value (typically referred as alpha or A). Therefore, GPUs have been designed to process images (e.g., four-dimensional (RGBA) data) very quickly and very efficiently.

Figure 13:
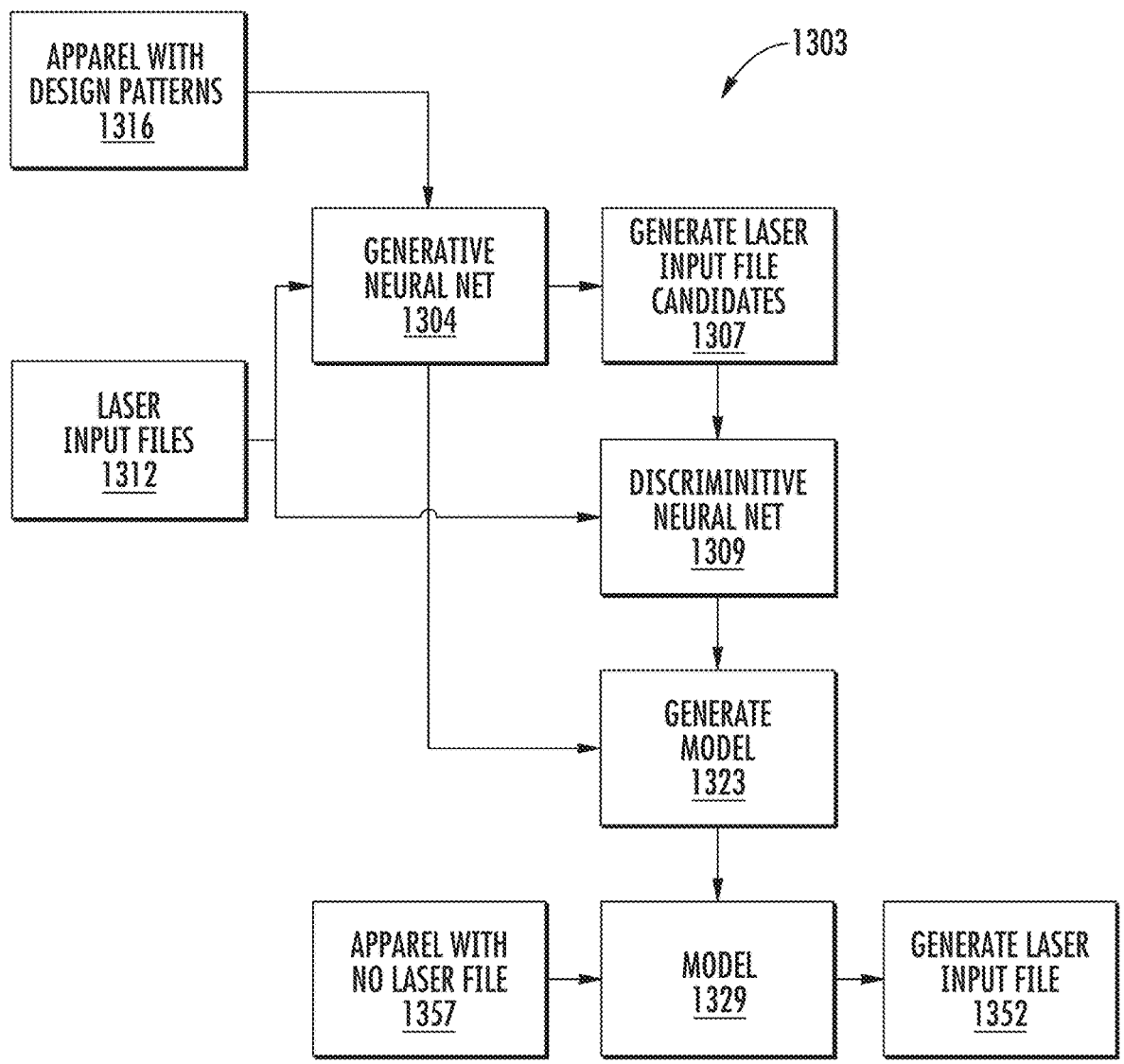
FIG. 13 shows a block diagram of machine learning using a generative adversarial network to generate laser input files for realistic wear patterns on apparel.

FIG. 13 shows a block diagram of machine learning using a generative adversarial network (GAN) 1303 to generate laser input files for realistic wear patterns on apparel. In an implementation, the generative adversarial network executes on a system having multiple graphics processors. The graphics processors or GPUs increase throughput, such as for training of neural nets that are part of the generative adversarial network and also for generating a model based on the training.

It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

A generative adversarial network is an architecture that typically incorporates some form of unsupervised machine learning. The generative adversarial network includes at least two neural networks. A first network may be referred to as a generative (G) neural network 1304 and generates candidates 1307. A second network, which may be referred to as a discriminative (D) neural network 1309, evaluates the candidates generated by the first network. The generative neural net tries to synthesize fake images that fool the discriminative neural net into thinking that the images are actual laser input files, not fake.

In a specific implementation, the input to generative neural net are images of garments with sample finished patterns with known laser input files. The known laser input files may be referred to as real data. Taking the sample images of garments, generative neural net generates laser input file candidates. These generated laser input file candidates can be referred to as fake data.

The generative adversarial network is trained by inputting images of laser input files with various patterns and designs 1312 and also images of the results of burning these laser input files onto apparel (e.g., jeans) 1316. Over time, with more training from greater numbers of input files, the generative neural net becomes better at generating laser input file candidates that are capable of fooling the discriminative neural net.

The amount of sample data used to train a generative adversarial network can vary, such as more than 100 samples, more than 200 samples, more than 300 samples, more than 500 samples, more than 800 samples, more than 900 samples, or more than 1000 samples. Generally, the greater number of samples, the better trained the generative adversarial network will. In an implementation, about 900 samples can be taken, which means there are 900 laser input files (real data) that are used to laser 900 different finishing patterns on, for example, jeans. This amount of real data sample can be further increased by various image processing or image manipulation techniques (e.g., lightening or darkening the images). The samples and image manipulated samples can be used as real data for the generative adversarial network.

Some files are described as being of an image file type. Some examples of image file types or file formats include bitmap or raster graphics formats including IMG, TIFF, EXIF, JPEG, GIF, PNG, PBM, PGM, PPM, BMP, and RAW. The compression for the file can be lossless (e.g., TIFF) or lossy (e.g., JPEG). Other image file types or file formats include vector graphics including DXF, SVG, and the like.

Bitmaps or raster graphics are resolution dependent while vector graphics are resolution independent. Raster graphics generally cannot scale up to an arbitrary resolution without loss of apparent quality. This property contrasts with the capabilities of vector graphics, which generally easily scale up to the quality of the device rendering them.

A raster graphics image is a dot matrix data structure representing a generally rectangular grid of pixels, or points of color, viewable via a monitor, paper, or other display medium. A bitmap, such as a single-bit raster, corresponds bit-for-bit with an image displayed on a screen or output medium. A raster is characterized by the width and height of the image in pixels and by the number of bits per pixel (or color depth, which determines the number of colors it can represent).

The BMP file format is an example of a bitmap. The BMP file format, also known as bitmap image file or device independent bitmap (DIB) file format or simply a bitmap, is a raster graphics image file format used to store bitmap digital images, independently of the display device. The BMP file format is capable of storing two-dimensional digital images of arbitrary width, height, and resolution, both monochrome and color, in various color depths, and optionally with data compression, alpha channels, and color profiles.

The generative neural net generates laser input files and synthesizes images to approximate a provided wear pattern (without a laser input file). The discriminative neural net evaluates each candidate generated. When the generated image appears photorealistic (or not fake) compared to the given image (without laser input file), the generative adversarial network has created or extracted a laser input file for a design that previously did not exist.

Then, information from the generative neural net and discriminative neural net are used to generate 1323 a model 1329. This model can be used to generate laser input files 1352 for given images of apparel with wear patterns 1357, where the results would appear realistic to the discriminative neural net.

In a specific implementation, the model is given images of a vintage garment with a wear pattern. Typically, there is not a laser input file for the vintage garment, since the wear pattern on the vintage garment was created by long-term wear. A jeans manufacturer like Levi Strauss & Co. has produced many jeans with a variety of wear patterns. The manufacturer has many existing wear pattern designs, which can include vintage wear patterns. Some wear patterns are referred to as authentic wear patterns which are the result of long-term wear. For example, a cowboy or cowgirl may wear a pair of jeans while ranching tending to cattle, riding houses, and participating in rodeos, and so forth. A miner may wear a pair of jeans while prospecting for gold, mining for coal, excavating a cavern, riding a mine train, and so forth. The result of the worker working in the jeans for a period of time (e.g., five or more years) without washing them will be an authentic wear pattern.

The apparel manufacturer wants to reproduce these existing, vintage, or authentic wear pattern designs (or portions or features of these designs) on garments. A laser system can be used to reproduce the wear pattern on new garments in an accelerated fashion, so that it will not take years to produce a garment.

An approach is to scan or take a photo of an existing garment with a wear pattern. Then with this scan or photo, create an inverted grayscale image. With the converted image, a laser prints (or burns) the wear pattern on another garment. However, the result of this approach is generally a very poor reproduction of the original wear pattern. The resulting wear pattern typically does not appear realistic, generally appearing flat—where the highs and lows in the coloration appear compressed.

There are reasons why this approach does not work. A reason is the material of the original garment and new garment are different. The laser has not been specifically configured for the characteristics of the material being burned. The scanning process or photo may not be a proper input file to control the laser for burning the pattern accurately.

Another approach for re-creating wear patterns is to enhance scans (e.g., via hand editing or hand drawing) of the existing pattern using a photo editing tool such as Adobe Photoshop. The editing process may use a computer, keyboard, mouse, or pen tablet input device (e.g., Wacom tablet), or any combination of these. This process is generally time consuming because significant manual editing is involved.

Therefore, it is desirable to obtain or extract a laser input file for this vintage garment, so that the vintage wear pattern may be reproduced more easily by laser finishing. Thus, the model (created through the generative adversarial network) is used to generate a laser input file output for this vintage garment. Then through laser finishing, a laser can burn laser input file onto a jeans template to re-create the vintage garment wear pattern. Using the approach in FIG. 13 and described above, the laser can re-create a wear pattern faster and more accurately than any previous approaches Furthermore, in order to operate and generate candidates, the generative adversarial network has a randomness component which normally only ensures that the final network is trained in a robust way (e.g., able to generalize well to new inputs), and this randomness component can be increased or decreased. Although the candidates generated by the generative network may not be photorealistic compared to the given image, these candidates may be suitable for use as new designs that had not be previously produced or manufactured. These candidates may be used a starting point for designs to make modifications to create new designs. Therefore, due to the randomness component (which can be varied), the generative adversarial network can be used to generate many new designs that have not previously existed. Another technique using a purely convolutional neural network architecture allows for the creation of novel garments by mixing the aesthetic qualities of a garment or other artwork with the structural content of another image.

Figure 14:
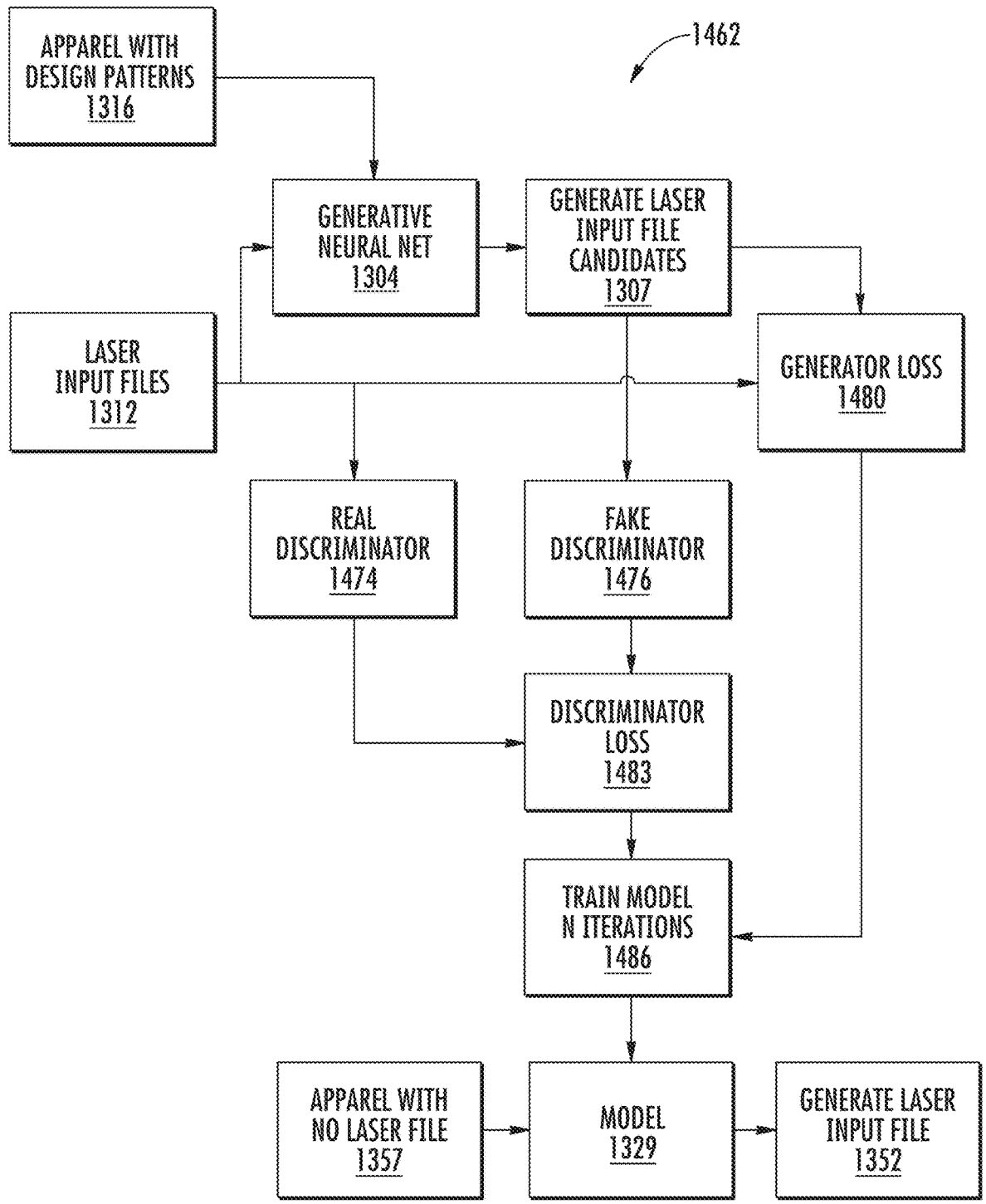
FIG. 14 shows another block diagram of machine learning using a generative adversarial network to generate laser input files for realistic wear patterns on apparel.

FIG. 14 shows another block diagram of machine learning using a generative adversarial network (GAN) 1462 to generate laser input files for realistic wear patterns on apparel. This system is similar to the network shown in FIG. 13 and described above. There is a generative neural net that generates laser input file candidates from images of sample garments with lasered finishing patterns with known laser input files. The known laser input files can be referred to as real data, while the generated laser input file can be referred to as fake data.

Compared to FIG. 13, in this network, discriminative neural net 1309 is split into two neural nets, a real discriminator 1474 and fake discriminator 1476. There are two loss components, a generator loss 1480 (which is composed of a distance loss in Euclidean space and a GAN loss) and a discriminator loss 1483 (which is composed of a real discriminator loss and a fake discriminator loss). Generator loss 1480 takes input from generated laser input file candidates 1307 (fake data) and laser input files data 1312 (real data) and outputs a distance loss value as well as a generator loss from the fake discriminator. These are input to a train model n iterations 1486 component.

Discriminator loss 1483 takes input from real discriminator 1474 (which receives real data) and fake discriminator 1476 (which receives fake data) and outputs a discriminator loss value, which is input to train model n iterations 1486. An output of train model n iterations 1486 is model 1329. Train model n iterations 1486 iterates on many laser input files and generated laser input file candidates until an error or loss based on the generator loss and discriminator loss values is reduced or minimized. When the loss values are reduced to a minimum, desired, or acceptable level, then that model can be used to create the laser input files from a given image of a jeans with finishing. An acceptable level can be determined by human judgment or review of a quality of the generated image.

Note that both the generator loss and discriminator loss take into account fake data. This is an adversarial aspect of the network. The generator is attempting to produce better fakes to fool the discriminator, while the discriminator is trying to improve itself in detecting fakes. Through adversarial training, the system improves its ability to produce a model that is used generate laser input file for a given image of a garment with the finishing pattern.

In short, to use this system, a user obtains a model by training the networks. This involves providing as input numerous examples of real data. Specifically, the real data would include laser input files and photos of the laser finished apparel which are from a result of lasering using these laser input files.

The system is also trained on generated data or fake data. This would include neural-net-generated laser input files, from generative neural net 1304 and generate laser input file candidates 1307. Training of a model continues until results from the generated laser input files become indistinguishable from the real laser input files. That is, the generative adversarial network is unable to distinguish the difference whether the image of apparel is a real or a fake.

At that point, when the model is given a photo of finished apparel for which a laser input file is not available, the model will be able to generate an appropriate laser input file to obtain that finished apparel using laser finishing.

An input to the real discriminator includes the input training or sample photos or images. An input to the discriminator includes the generated photos from the generative neural network. A loss is then calculated by strategically combine three loss measures, distance, discriminator, and generator. This can be done by the relationships (in Python programming language and TensorFlow framework from Google) as follows:

discrim_loss=*tf*.reduce_mean(-(*tf*.log(predict real+ EPS)+*tf*.log(1-predict_fake+EPS)))

gen_loss GAN=reduce_mean(-*tf*.log(predict_fake+ EPS))

gen_loss_*L*1=*tf*.reduce_mean(*tf*.abs(targets-outputs))

gen_loss=gen_loss_GAN*a.gan_weight+gen_loss *L*1*a.11_weight.

Note that both the generator and the discriminator loss both have "predict_fake" loss in the relationships. This means that the discriminator and the generator both care about how good the "fake" or generated image is. To keep the discriminator loss "honest," the technique factors in the ability to tell what a real image is and make sure that it can still correctly guess a real image taken from the data while calling a fake a fake. To keep the generator "honest," the technique forces the generator to deal with the actual Euclidean distance from the intended output is. Because there is one discriminator loss function that trains both the real and fake discriminator, both are dependent on each other; without the other each discriminator could become biased. Similar relationship applies for the generator loss (e.g., combining predict_fake and distance loss).

Figure 15:
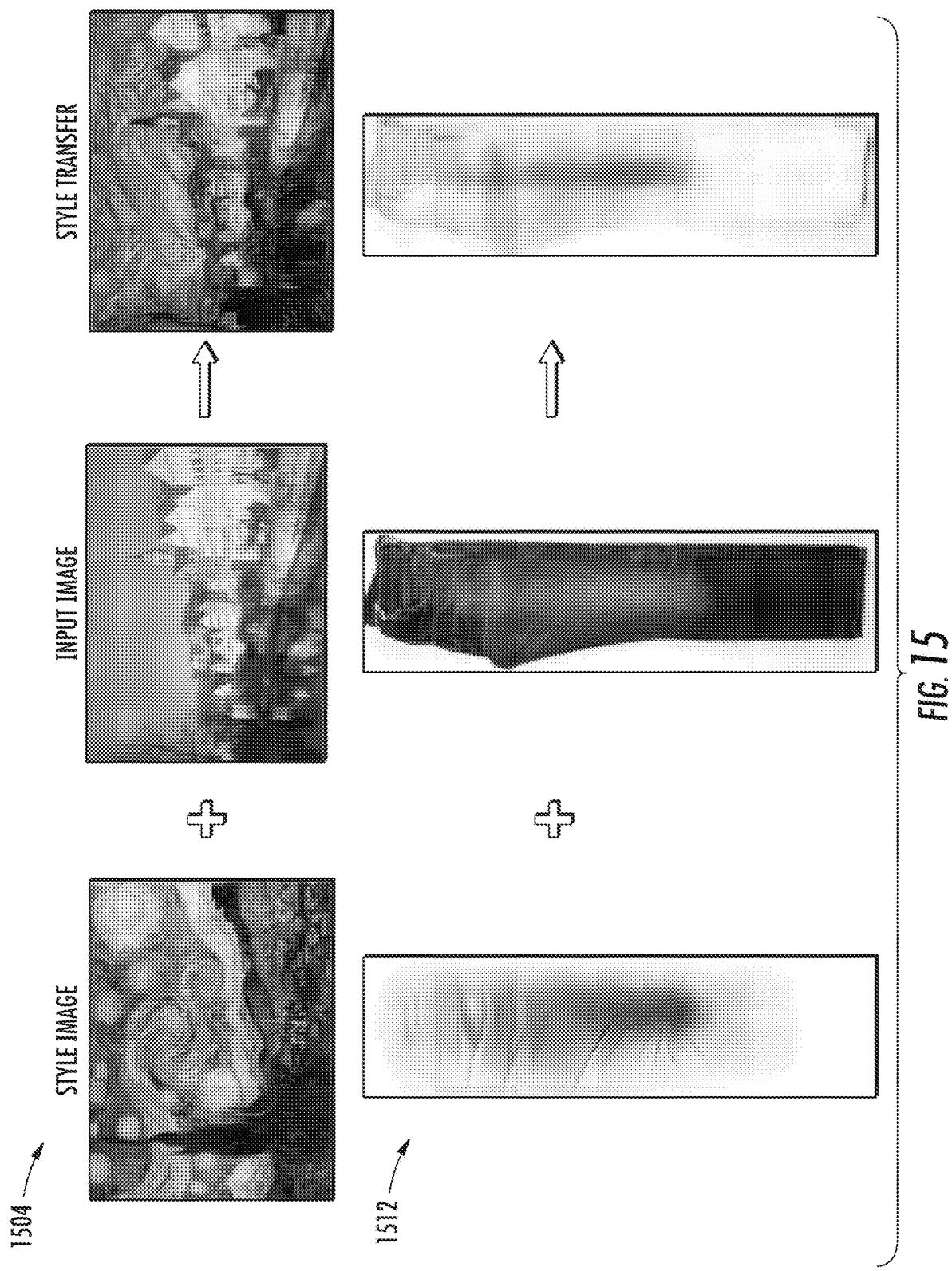
FIG. 15 shows a technique of a convolutional style transfer by way of a style transfer convolutional network.

FIG. 15 shows a technique of neural style transfer using a convolutional neural network. This technique using a purely convolutional neural network architecture allows for the creation of novel garments by mixing the aesthetic qualities from a laser pattern with the form factor (or topology) from another separate garment. These combinations may be mixed and matched to create novel product.

In an upper row 1504, a style image (e.g., Starry Nights by Vincent van Gogh) is combined with an input image (e.g., photograph of homes along a river), and the output from the convolutional neural network is an image with the style transferred (e.g., painting of the photograph in the Starry Nights style).

In a lower row 1512, a style image (e.g., laser input file) is combined with an input image (e.g., image of jeans), and the output from the style transfer convolutional network is an image with the style transferred (e.g., jeans with wear pattern in the style of the style image).

Figure 16:
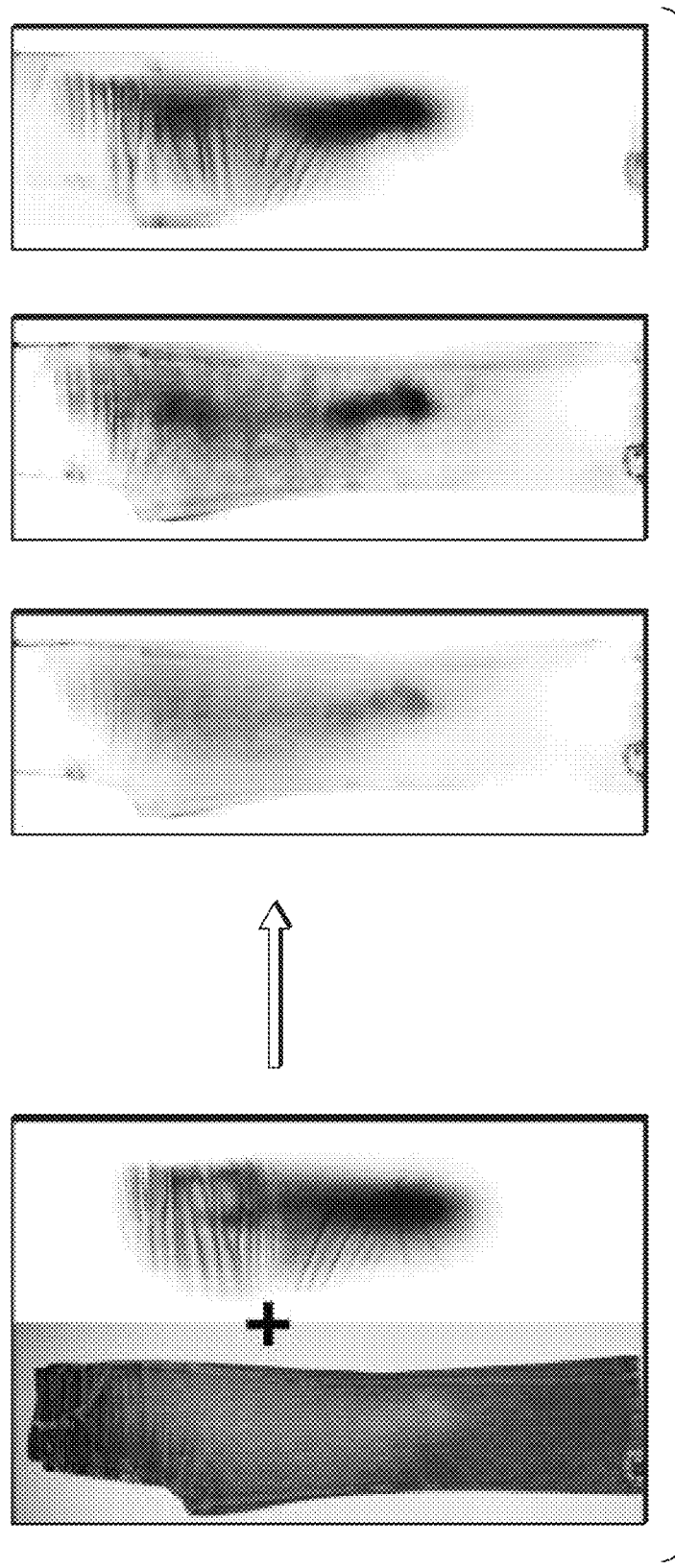
FIG. 16 shows another example of a convolutional style transfer.

FIG. 16 shows another example of a neural style transfer. In this example, the same input and style images are used to generate three different outputs, which each differs from each other in appearance. This example shows how a style transfer convolutional network can also be used to generate multiple designs from the same input.

Artificial neural networks can be used for creative content development. A designer inputs style factors, and the technique generates novel finish patterns. Artificial neural networks can stylize existing finishes. Artificial neural networks can generate patterns for carryover finishes. Artificial neural networks can generate printable finish patterns for nonspecific briefs (e.g., full package in a box).

Figure 17:
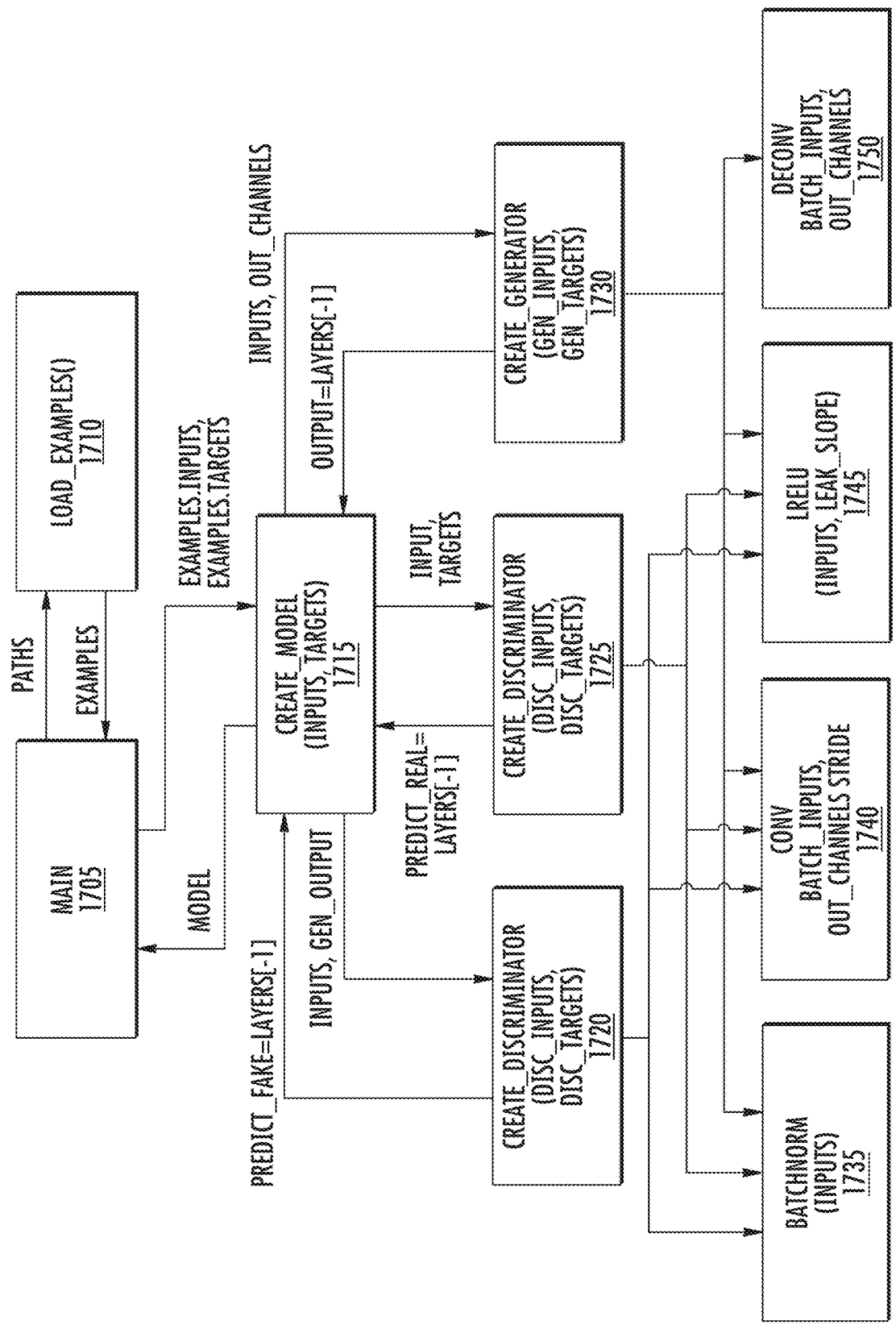
FIG. 17 has shows a more detailed system diagram of a conditional generative adversarial neural network (cGAN) to generate laser input files for realistic wear patterns on apparel.

FIG. 17 has shows a more detailed system diagram of a conditional generative adversarial neural network (cGAN) to generate laser input files for realistic wear patterns on apparel. The system can be implemented in software using one or more general purpose computers, hardware with firmware code, or specialized hardware.

The components of the system include main 1705, load_examples( ) 1710, create_model 1715, create_discriminator 1720, create_discriminator 1725, create_generator 1730, batchnorm 1735, conv 1740, lrelu 1745, and deconv 1750.

Main 1705 generates a paths output for load_examples 1710 and receives examples from load_examples( ). An initial setup occurs within main 1705, taking in user variables and recording settings. Main checks a path or paths for input and output validity; creates a file list; makes input data into tensor flow manipulatable objects; splits input data into A side and B side, sets up data manipulation (e.g., flip or random crop), and calculates a model steps_per_epoch. Main returns RETURN Example{paths_batch, inputs_batch, targets_batch, len(input_paths), steps_per_epoch}.

Create_model 1715 receives examples.inputs and examples.target from main and outputs a model to main. Create_model outputs inputs and out_channels to create_generators 1730, and receive output=layers[−1]. In a specific implementation, create_model creates a first encoder layer with a 4×4 convolution, stride 2 of the input; creates a list of encoder layer definitions; create subsequent layers within a for loop iterating over the list of layer definitions (e.g., lrelu→conv→batchnorm→append layer); and creates a list of decoder layer definitions including a dropout percentage. Create_model creates decoder layers using a for loop to enumerate over the decoder layers. Skip connections (U-Net) are included where appropriate and appending to layers. A convolution (conv) operation is replaced by deconvolution (deconv) operation. A leaky rectified linear unit activation function (lrelu) function is replaced by a rectified linear unit activation function (relu) function. See below for further discussion. Then, a final layer or generated image is returned.

Figure 18:
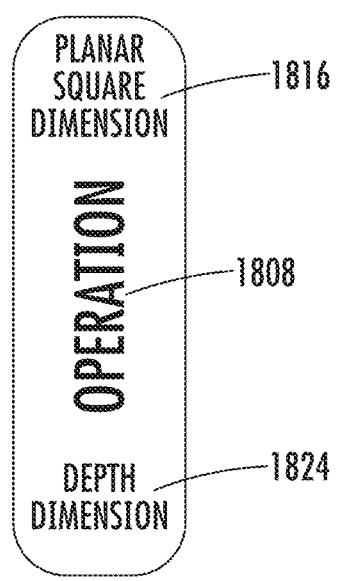
FIG. 18 shows an individual operation module for a conditional generative adversarial neural network to generate laser input files for realistic wear patterns on apparel.

FIG. 18 shows an individual operation module for a conditional generative adversarial neural network for laser finishing. The module blocks lists an operation 1808, planar square dimension 1816, and depth dimension 1824. Some examples of operations include: Input, Conv, DeConv, LReLu, ReLu, BatchNorm, and Dropout. Conv represents a convolution operation. DeConv represents a transpose convolution or deconvolution operation. ReLu represents a rectified linear unit activation function. LReLu represents a leaky rectified linear unit activation function.

Figure 19A:
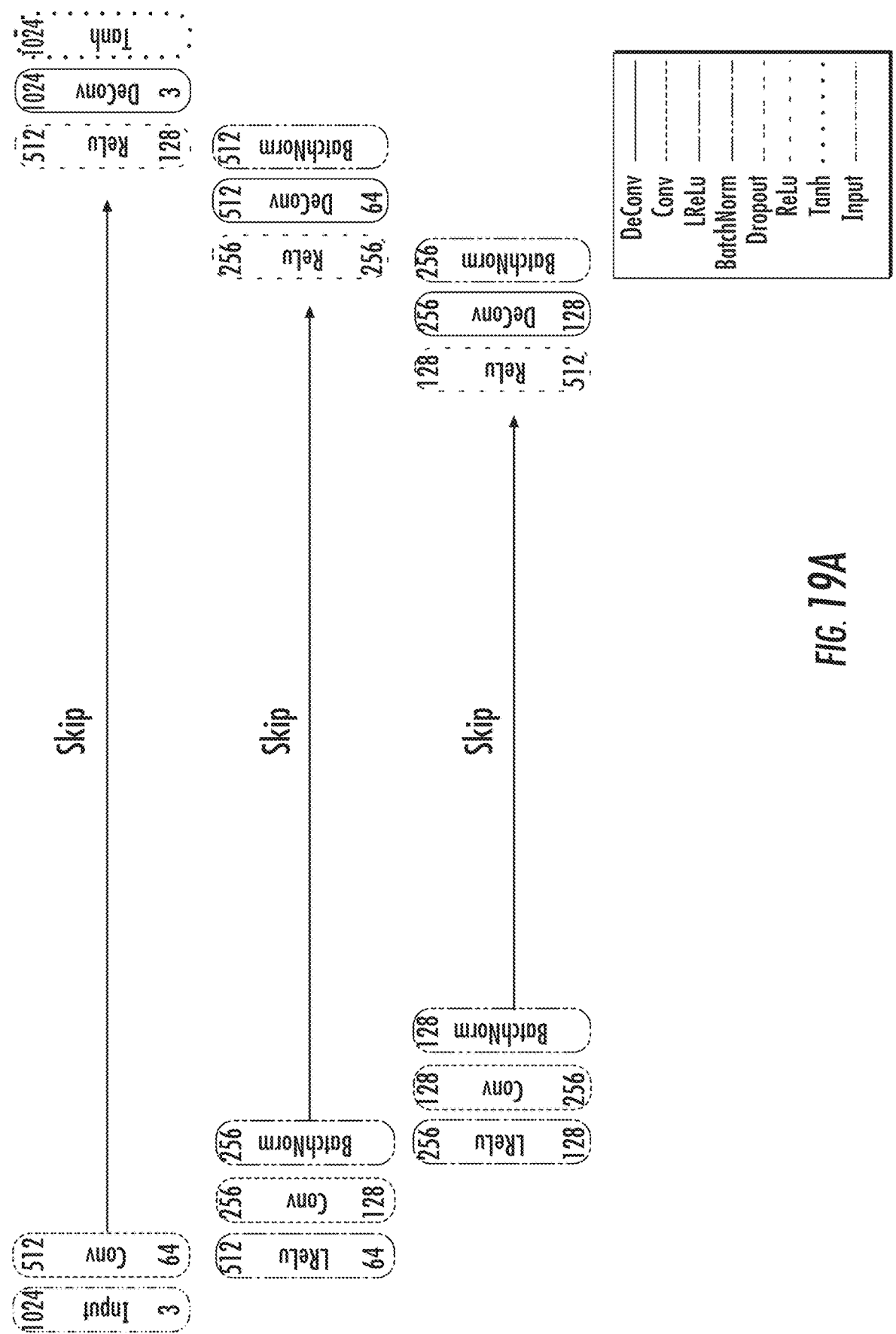
FIGS. 19A-19C show an implementation of a generator of a generative adversarial neural network to generate laser input files for realistic wear patterns on apparel.
Figure 19B:
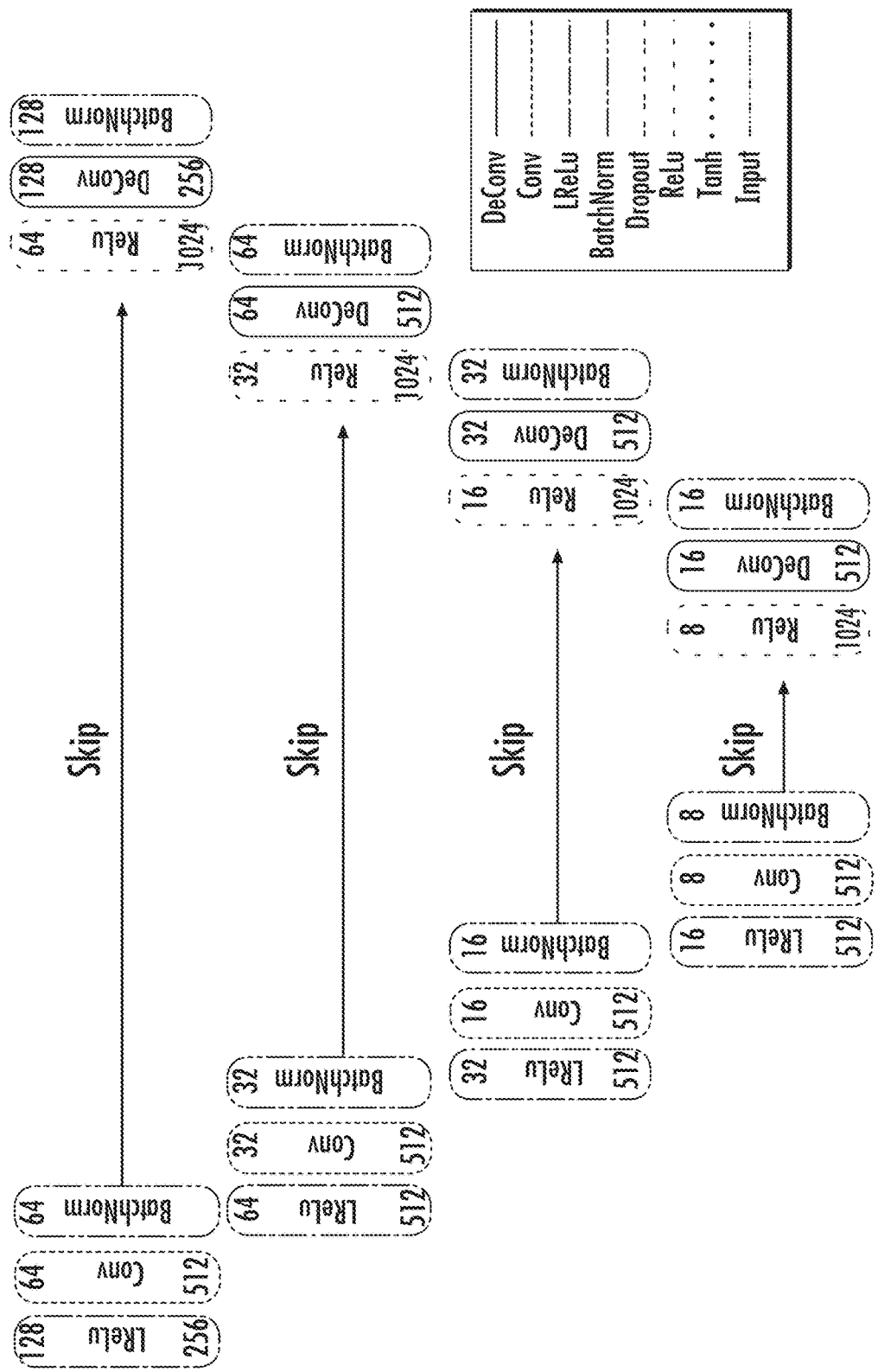
Figure 19C:
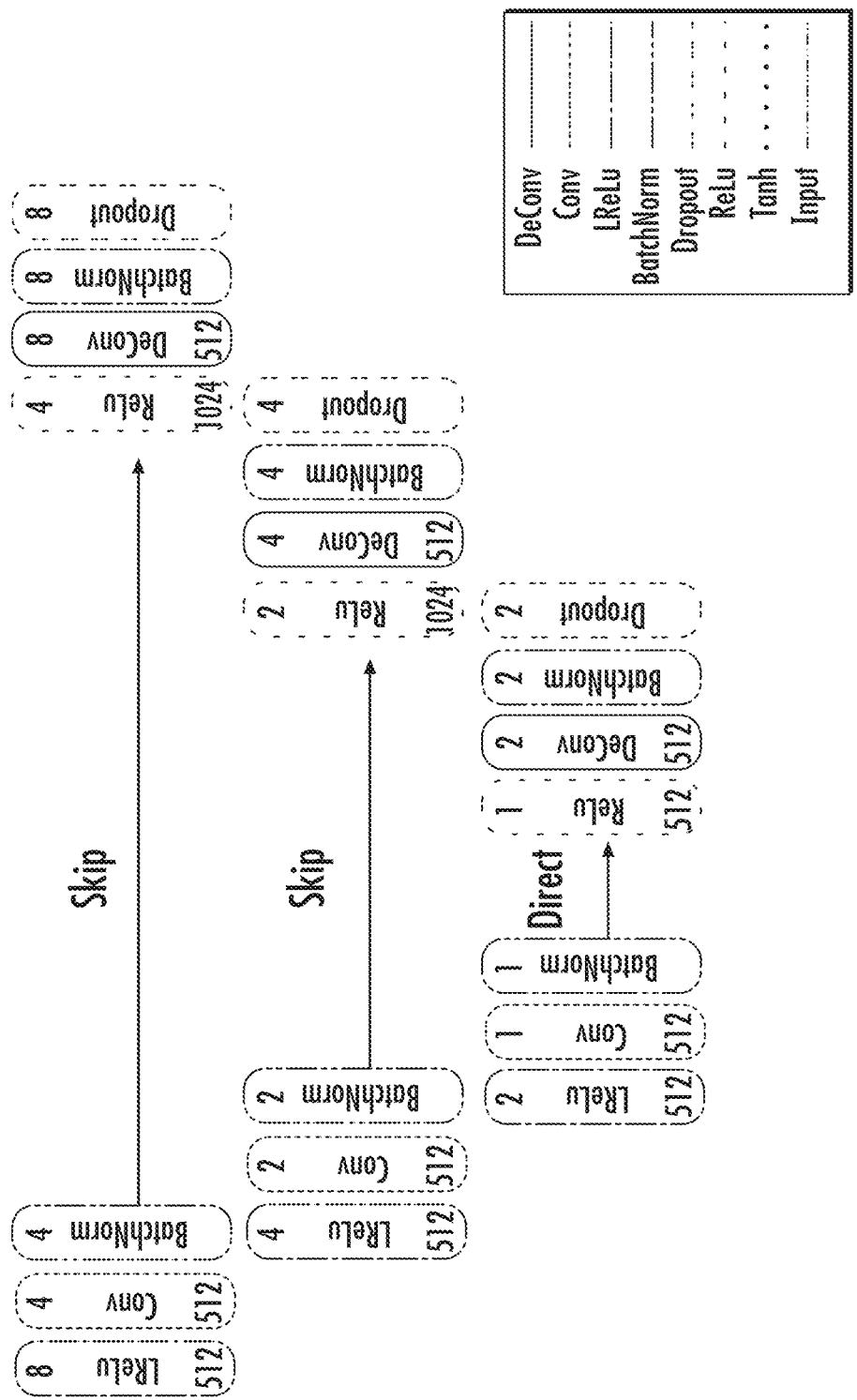

FIGS. 19A-19C show an implementation of a generator architecture of a generative adversarial neural network to generate laser input files for realistic wear patterns on apparel. In this implementation, conv is a 4×4 stride 2, deconv is a transpose convolution, and lrelu has a 0.2 slope when a value is less than 0.

Figure 20A:
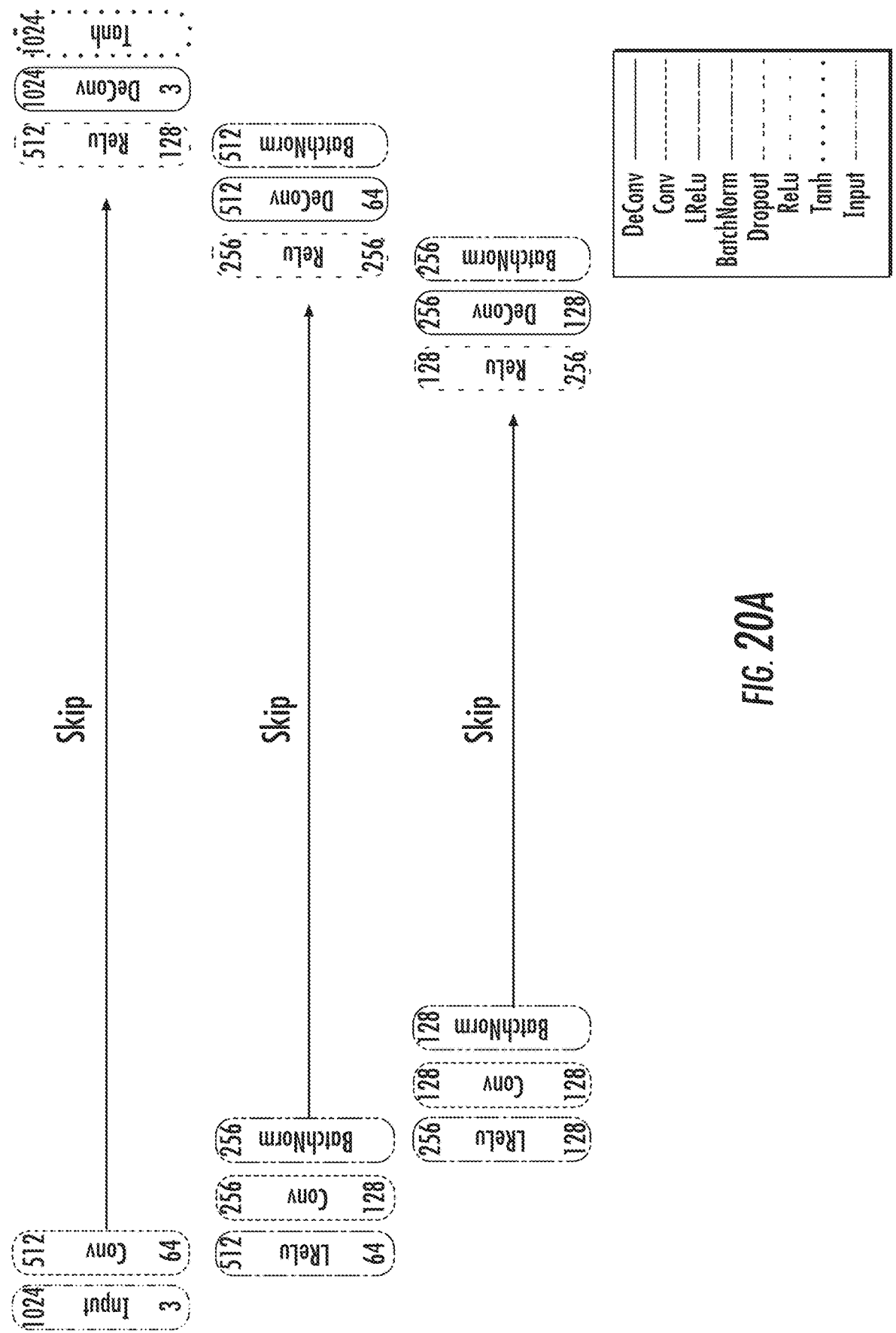
FIGS. 20A-20C show another implementation of a generator of a generative adversarial neural network to generate laser input files for realistic wear patterns on apparel.
Figure 20B:
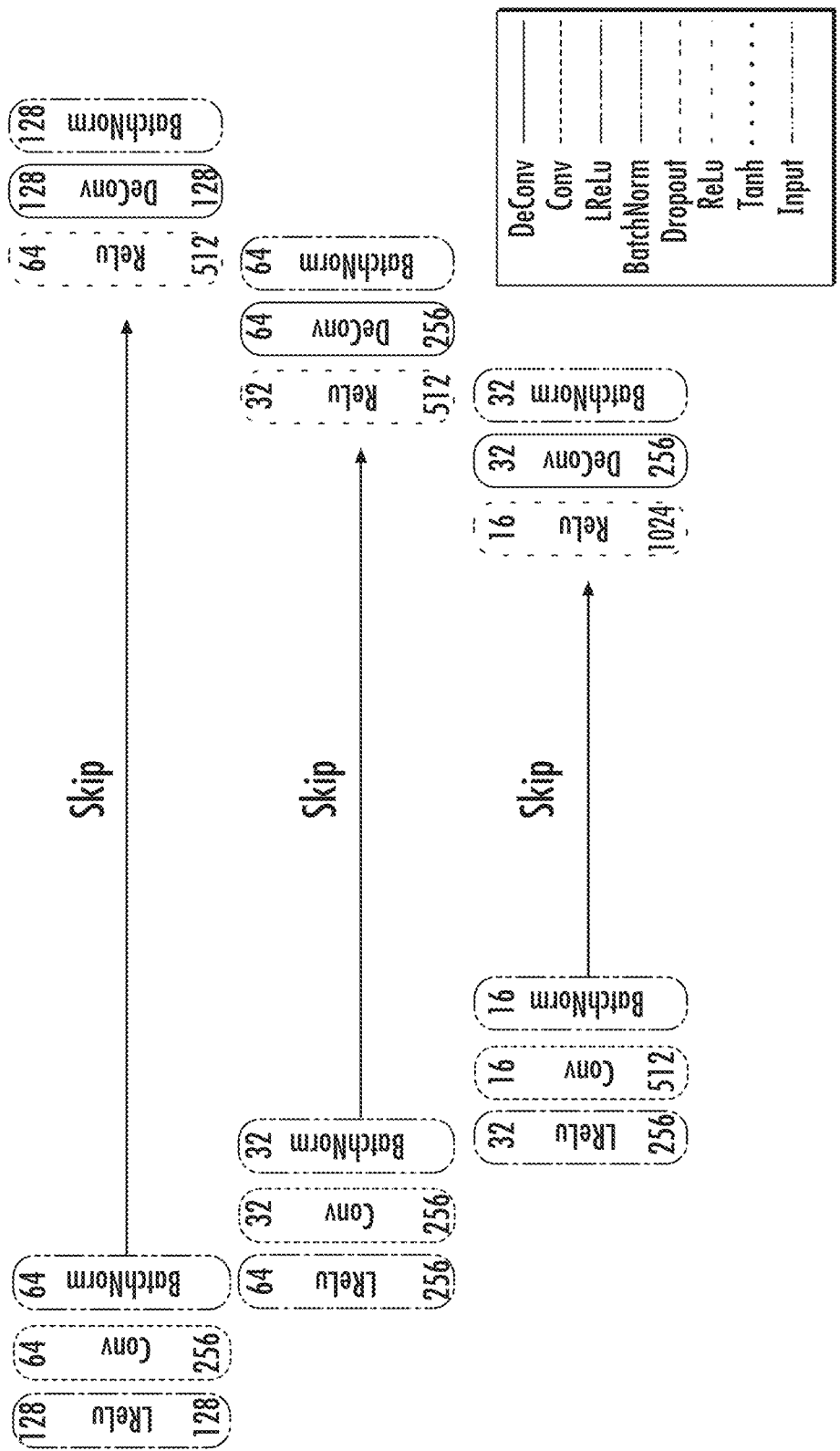
Figure 20C:
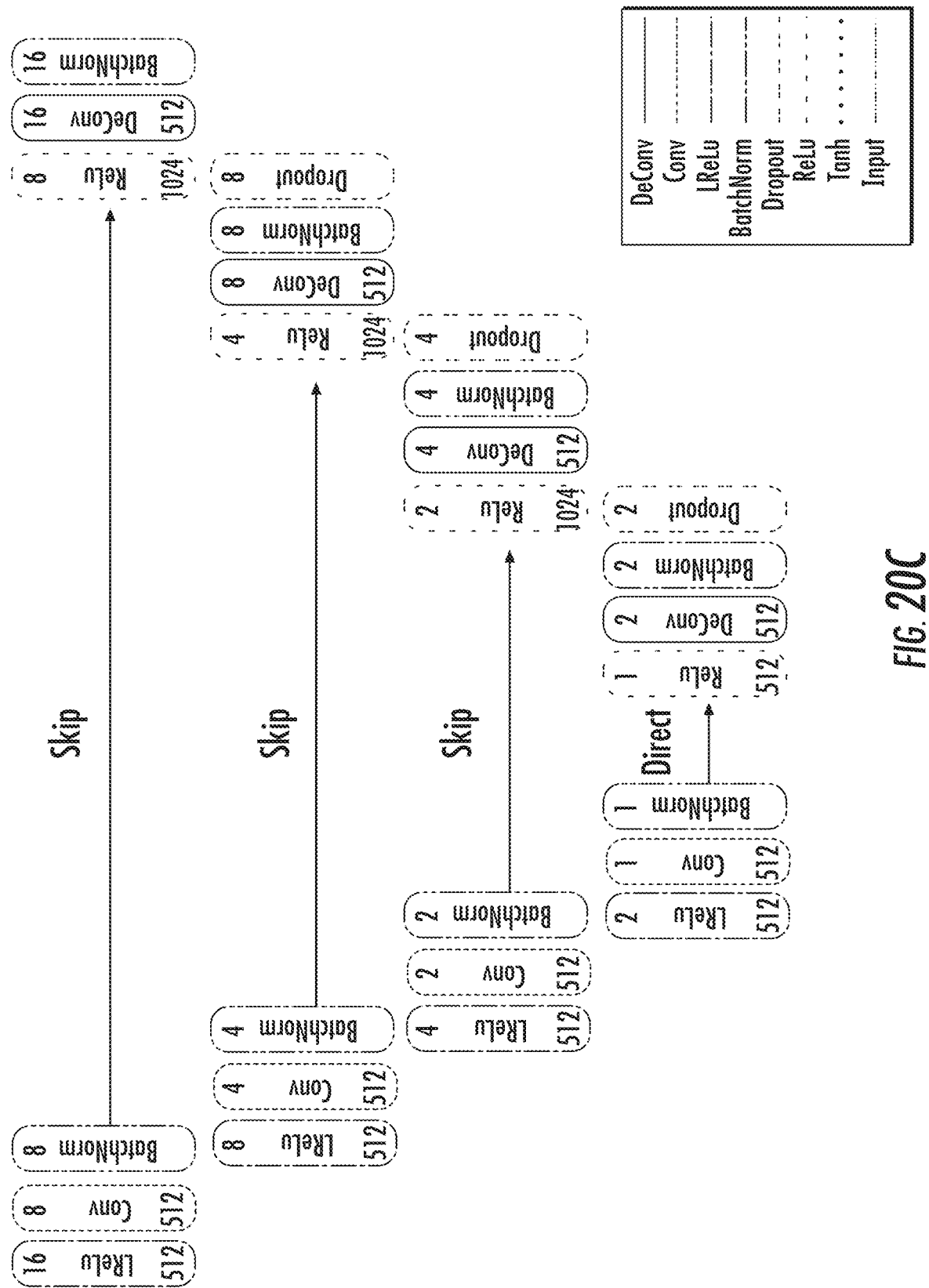

FIGS. 20A-20C show another implementation of a generator architecture of a generative adversarial neural network to generate laser input files for realistic wear patterns on apparel.

Returning to FIG. 17, for a real discriminator operation, create_models outputs inputs and targets to create_discriminator 1725, and receives predict_real=layers[−1]. FIG. 20 shows an example of an implementation of operation of these components. For an implementation, conv are 4×4 full depth filters, and lrelu has 0.2 slope when less than 0.

The operations include: concatenate disc_input and disc_target from input, and targets are from the data set; create the first layer with input→conv→lrelu; create subsequent layers within a for loop iterating a specified number of discriminator layers (e.g., conv→batchnorm→lrelu→append layer); create last layer with conv→sigmoid; and return final layer (e.g., 30×30 grade of "realness").

Figure 21:
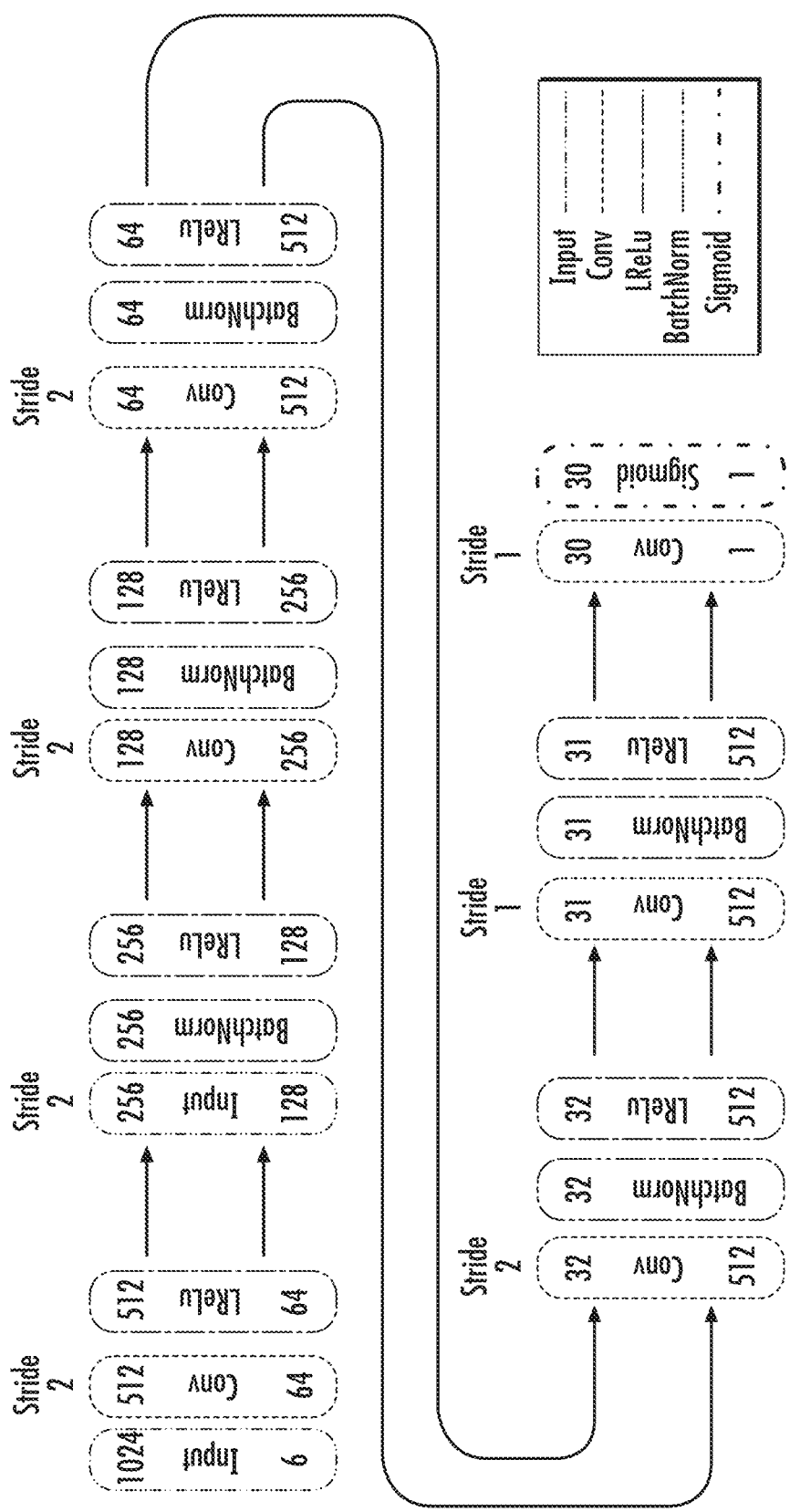
FIG. 21 shows an implementation of a discriminator of a generative adversarial neural network to generate laser input files for realistic wear patterns on apparel.

Returning to FIG. 17, for a fake discriminator operation, create_models outputs inputs and gen_output to create_discriminator 1720, and receives predict_fake=layers[−1]. This is similar to the operation described above, but with predicted fake layers rather than predicted real layers. Similarly, FIG. 21 shows an implementation of a discriminator architecture of a generative adversarial neural network to generate laser input files for realistic wear patterns on apparel. For an implementation, conv are 4×4 full depth filters, and lrelu has 0.2 slope when less than 0.

Similarly, the operations include: concatenate disc_input and disc_target from input, and targets are the generator outputs; create the first layer with input→conv→lrelu; create subsequent layers within a for loop iterating a specified number of discriminator layers (e.g., conv→batchnorm→lrelu→append layer); create last layer with conv→sigmoid; and return final layer (e.g., 30×30 grade of "fakeness").

Returning to FIG. 17, the batchnorm, conv, lrelu, and deconv components (such as shown in FIGS. 19 and 20) represent the modules and their inputs, which are generated by create_discriminator 1720, create_discriminator 1725, and create_generator.

Figure 22:
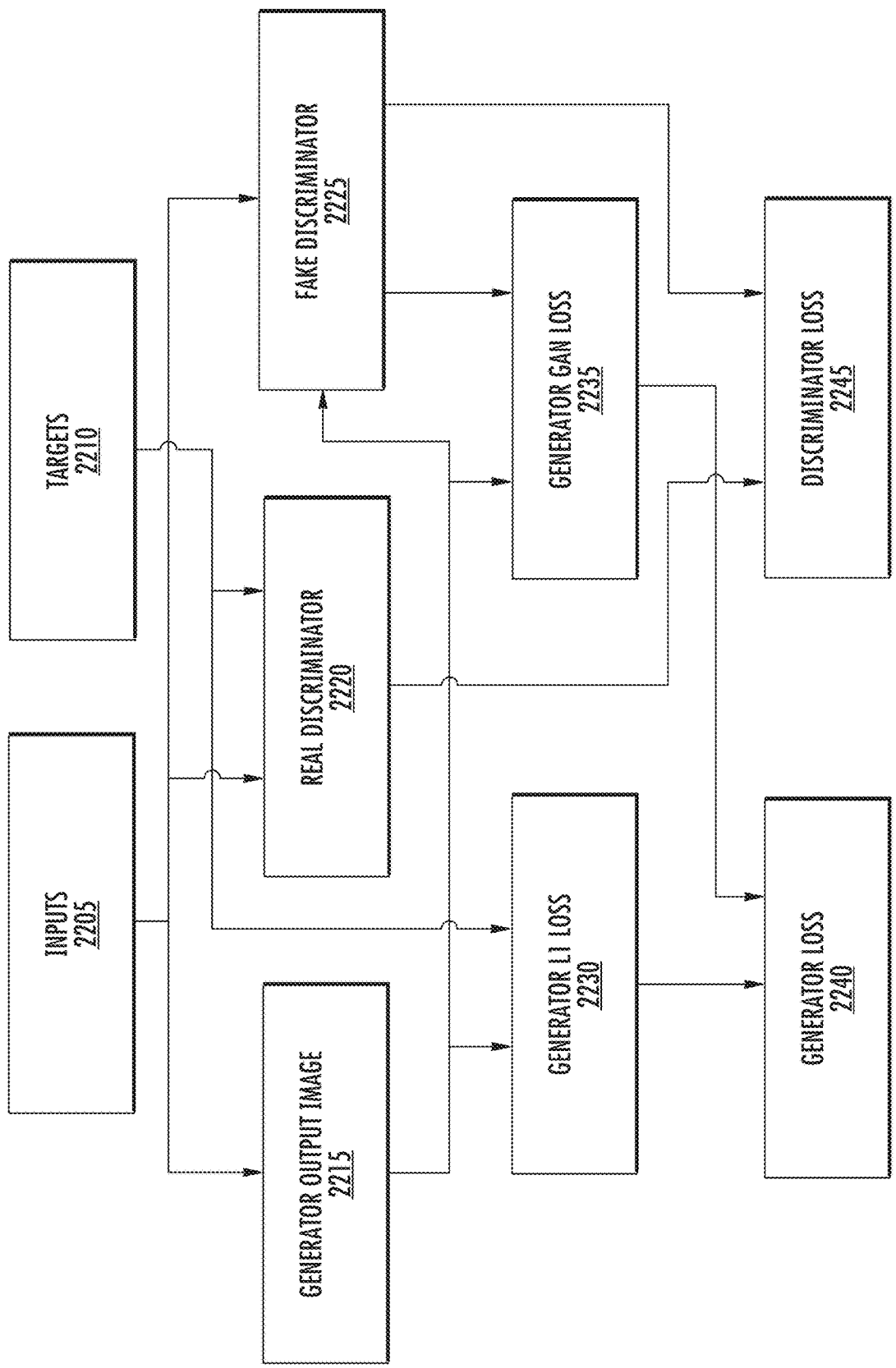
FIG. 22 shows an overall block diagram of a loss structure of the generative adversarial neural network to generate laser input files for realistic wear patterns on apparel.

FIG. 22 shows an overall block diagram of a loss structure of the generative adversarial neural network to generate laser input files for realistic wear patterns on apparel. The components include inputs 2205, targets 2210, generator output image 2215, real discriminator 2220, fake discriminator 2225, generator L1 loss 2230, generator GAN loss 2235, generator loss 2240, and discriminator loss 2245.

For the generative adversarial network, the real discriminator, fake discriminator, and generator output image components are artificial neural networks of a machine learning system. The generator output image component generates candidates, while the real discriminator and fake discriminator evaluate the candidates. In a specific implementation, the candidates are laser image files used for laser finishing apparel such as jeans.

Inputs 2205 include photos or images (e.g., photos of laser finished garments and laser input files used to produce the finished garments), which are provided as input to generator output image 2215, real discriminator 2220, and fake discriminator 2125 components. The real discriminator can take real images as input while the fake discriminator can take as input fake images. The generator output image receives photos (e.g., photos of laser finished garments with known laser input files) and generates output images (e.g., laser image files or laser input files) as candidates. The generated output images can be referred to as fake data, while the know laser input files can be referred to as real data.

The real discriminator and fake discriminator components are difference machines, comparing their inputs and determining whether a given image is "real" or "fake." Specifically, the real discriminator determines differences between real images (from inputs 2205) and target images (from targets 2210). The fake discriminator determines differences between fake images (from generator output image 2215) and inputs 2205.

Generator L1 loss 2230 determines a generator loss 2240 based on outputs of the generator output image and fake discriminator. Generator GAN loss 2230 determines a discriminator loss 2245 based on outputs of the real and fake discriminators.

An equation (in Python programming language and TensorFlow framework from Google) for discrimator loss is:

discrim_loss=$tf$.reduce_mean(-($tf$.log(predict_real+EPS)+$tf$.log(1-predict_fake+EPS))).

Equations (in Python programming language and TensorFlow framework from Google) for the generator loss are:

gen_loss_GAN=$tf$.reduce_mean(-$tf$.log(predict_fake+EPS)), gen_loss_$L1$=$tf$.reduce_mean($tf$.abs(targets-outputs)), and gen_loss=gen_loss_GAN*$a$.gan_weight+gen_loss_$L1$*$a$.l1_weight.

More specifically, the fake discriminator uses the generator output as part of its input and then outputs "predict_fake" which is used by the discriminator loss to tell (part of) how good it is at detecting real versus fake. Output "predict_fake" is also used in generator loss to determine how well it can fool the discriminator. In this way the loss function becomes data dependent and allows a benefit through adversarial training. The generator also uses a direct distance metric to determine how close it is to what is in the data set. In this way the generator fits to the solution in the dataset.

When using laser finishing to burn a pattern, various laser levels can be obtained by varying an output of the laser beam by altering a characteristic of a laser waveform such as a frequency, period, pulse width, power, duty cycle, or burning speed. The pattern can be formed by a single pass of the laser or multiple passes.

In an implementation, a system includes an assembled garment made of a fabric material, where the assembled garment will be exposed to a laser beam that will create a finishing pattern on a surface of the assembled garment.

There is a laser that emits the laser beam, where the laser beam will form a finishing pattern on the surface of the fabric material of the assembled garment based on the laser input file. The laser input file is obtained by machine learning as discussed above. The laser input file can be a reverse image.

The assembled garment can include fabric panels that have been sewn together using thread to form pants legs, a crotch region for the pants, and pocket openings for the pants. Before exposure to the laser, the assembled garment does not have a finishing pattern. The fabric material can use a warp yarn having indigo ring-dyed cotton yarn and undyed weft yarn.

The finishing pattern on the surface of the fabric material of the assembled garment can be formed by removing a selected amount of material from the surface of the fabric material of the assembled garment based on the laser input file. Laser levels at an output of the laser beam are altered based on the laser input file by varying a characteristic of a laser such as a frequency, period, pulse width, power, duty cycle, or burn speed.

In an implementation, a method includes assembling a jeans made from fabric panels of a woven first denim material including a warp having indigo ring-dyed cotton yarn, where the fabric panels are sewn together using thread. A laser input file is created that is representative of a finishing pattern from an existing jeans made from a second denim material. The first denim material has a different fabric characteristic from the second denim material. The creating the laser input file can include: using machine learning to form a model, where the model generates the laser input file for an image of the existing garment with the finishing pattern.

A laser is used to create a finishing pattern on an outer surface of the jeans based on a laser input file. Based on the laser input file, the laser removes selected amounts of material from the surface of the first material at different pixel locations of the jeans. For lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed. The finishing pattern created can extend across portions of the jeans where two or more fabric panels are joined together by the threads by exposing these portions to the laser.

The first denim material can have a weft yarn that has not been indigo dyed. For the portions of the jeans exposed to the laser where the fabric panels are joined, the fabric panels are joined together using a thread having cotton.

The first denim material can have a first surface texture characteristic that is different from a second surface texture characteristic of the second denim material. The first denim material can have a first dye characteristic that is different from a second dye characteristic of the second denim material. The first denim material can have a first base fabric color characteristic (e.g., color shade or color tint) that is different from a second base fabric color characteristic of the second denim material. The first denim material can have a first yarn characteristic (e.g., ring dye effect) that is different from a second yarn characteristic of the second denim material. For example, the thickness of the ring dyed region can be different. The diameter of the core region can be different.

Further, the first denim material can have a first yarn weight characteristic that is different from a second yarn weight characteristic of the second denim material. The first denim material can have a first yarn diameter characteristic that is different from a second yarn diameter characteristic of the second denim material. The first denim material can have a first yarn twist characteristic (e.g., number of twists) that is different from a second yarn twist characteristic of the second denim material.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A plurality of garments comprising:
a plurality of sample garments with lasered finishing patterns resulting from a plurality of sample laser input files;
a target garment comprising fabric panels made from a woven first material comprising a warp comprising dyed cotton yarn, wherein the fabric panels are sewn together using thread;
an outer surface of the target garment comprises a finishing pattern created by a laser based on a laser input file, wherein before lasering, a cross section of the warp of the target garment comprises a generally round shape,
after being exposed to the laser and a depth of material that has been removed, a cross section of the warp comprises a region with a flattened shape relative to the generally round shape before lasering; and
an existing garment made from a second material, wherein the first material comprises a different fabric characteristic from the second material, and the existing garment was created before the target garment was created,
the laser input file comprises digital data that is representative of a finishing pattern from the existing garment,
sample laser input files and images of sample garments with lasered finishing patterns that result from the sample laser input files are input to a generative adversarial network, and the sample laser input files comprise real laser input files,
fake laser input files are generated by a generative neural net of the adversarial network for images of sample garments with lasered finishing patterns,
a generator loss is determined based on the fake laser input files and real laser input files,
the real laser input files are input to a real discriminator and a fake discriminator of a generative adversarial network,
the fake laser input files are input to the fake discriminator of the generative adversarial network,
a discriminator loss is determined based on outputs of the real discriminator and fake discriminator,
a model is iteratively trained to obtain a final model based on outputs of the generator loss and discriminator loss, and
the laser input file for an image of the existing garment with the finishing pattern is generated by the final model.

2. The garments of claim 1 wherein the warp is ring dyed using an indigo dye,
based on the laser input file, selected amounts of material have been removed by the laser from the surface of the first material at different pixel locations of the target garment, and
for lighter pixel locations of the finishing pattern, a greater amount of the dyed cotton warp yarn is removed, revealing a greater width of an inner core of the dyed yarn, while for darker pixel locations of the finishing pattern, a lesser amount of the dyed cotton warp yarn is removed, revealing a lesser width of an inner core of the dyed yarn.

3. The garments of claim 1 wherein the finishing pattern created can extend across portions of the target garment where two or more fabric panels are joined together by thread by exposing these portions to the laser.

4. The garments of claim 1 wherein the first material comprises a weft comprising yarn that has not been dyed.

5. The garments of claim 1 wherein for the portions of the target garment exposed to the laser where the fabric panels are joined, the fabric panels are joined together using a thread comprising cotton.

6. The garments of claim 1 wherein the finishing pattern on the outer surface of the target garment was created by a single pass of a laser.

7. The garments of claim 1 wherein the finishing pattern on the outer surface of the target garment was created by multiple passes of a laser.

8. The garments of claim 1 wherein a target image of the finishing pattern is captured from the existing garment of the second material comprises using contrast limited adaptive histogram equalization image processing.

9. The garments of claim 1 wherein to create the finishing pattern on the outer surface of the target garment, different laser levels are obtained by varying an output of a laser beam by altering a characteristic of the laser comprising at least one of a frequency, period, pulse width, power, duty cycle, or burning speed.

10. The garments of claim 1 wherein the first material comprises a first surface texture characteristic which is different from a second surface texture characteristic of the second material.

11. The garments of claim 1 wherein the first material comprises a first dye characteristic which is different from a second dye characteristic of the second material.

12. The garments of claim 1 wherein the first material comprises a first base fabric color characteristic which is different from a second base fabric color characteristic of the second material.

13. The garments of claim 1 wherein the first material comprises a first yarn characteristic which is different from a second yarn characteristic of the second material.

14. The garments of claim 1 wherein the first material comprises a first yarn weight characteristic which is different from a second yarn weight characteristic of the second material.

15. The garments of claim 1 wherein the first material comprises a first yarn diameter characteristic which is different from a second yarn diameter characteristic of the second material.

16. The garments of claim 1 wherein the first material comprises a first yarn twist characteristic which is different from a second yarn twist characteristic of the second material.

17. The garments of claim 1 wherein the finishing pattern on the existing garment was not created by a laser.

18. The garments of claim 1 wherein the finishing pattern created by the laser on the target garment includes a wear pattern comprising at least one of combs or honeycombs, whiskers, stacks, or train tracks, or a combination.

19. A plurality of garments comprising:
a target garment comprising fabric panels made from a woven first material comprising a warp comprising dyed cotton yarn, wherein the fabric panels are sewn together using thread;
an outer surface of the target garment comprises a finishing pattern created by a laser based on a laser input file, wherein before lasering, a cross section of the warp of the target garment comprises a generally round shape, after being exposed to the laser and a depth of material that has been removed, a cross section of the warp comprises a region with a flattened shape relative to the generally round shape before lasering; and an existing garment made from a second material, wherein the first material comprises a different fabric characteristic from the second material, the existing garment with a finishing pattern existed before the target garment was created, and the finishing pattern on the existing garment was not created by a laser, the laser input file comprises digital data that is representative of the finishing pattern from the existing garment, a generative adversarial network comprises a generative neural net and a discriminative neural net, a model is formed from the generative adversarial network, and the laser input file for an image of the existing garment with the finishing pattern is generated by the model.

20. The garments of claim 19 wherein the garment comprises at least one of jeans, shirts, shorts, jackets, vests, or skirts.

21. The garments of claim 19 wherein the generative neural net generated fake laser input files and the fake laser input files are input to the discriminative neural net.

* * * * *